(12) United States Patent
Hiramoto et al.

(10) Patent No.: US 6,657,953 B1
(45) Date of Patent: Dec. 2, 2003

(54) SIGNAL LOOPBACK DEVICE

(75) Inventors: Masanori Hiramoto, Yokohama (JP); Hidetaka Kawahara, Yokohama (JP); Keiichiro Tsukamoto, Kawasaki (JP); Akihiko Oka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/052,389

(22) Filed: Mar. 31, 1998

(30) Foreign Application Priority Data

Jun. 27, 1997 (JP) .............................................. 9-172604

(51) Int. Cl.[7] .............................................. H04L 12/26
(52) U.S. Cl. ........................ 370/224; 370/249; 370/324; 370/535
(58) Field of Search .............................. 370/216, 222, 370/223, 224, 250, 241, 244, 247, 324, 248, 249; 714/716, 717

(56) References Cited

U.S. PATENT DOCUMENTS

| | | | | |
|---|---|---|---|---|
| 4,631,719 A | * | 12/1986 | Huffman et al. | 370/249 |
| 5,060,226 A | * | 10/1991 | Gewin et al. | 370/244 |
| 5,166,923 A | * | 11/1992 | Ohmori et al. | 370/224 |
| 5,757,776 A | * | 5/1998 | Ellebracht et al. | 370/244 |

FOREIGN PATENT DOCUMENTS

| | | |
|---|---|---|
| JP | 4120940 | 4/1992 |
| JP | 563674 | 3/1993 |

* cited by examiner

Primary Examiner—Chi Pham
Assistant Examiner—Alexander O. Boakye
(74) Attorney, Agent, or Firm—Katten Muchin Zavis Rosenman

(57) ABSTRACT

A signal loopback device including a multiplexing/demultiplexing unit to carry out multiplexing/demultiplexing between a DS3 signal serving as a digital signal conforming to a DS3 C-bit parity system and a DS1 signal, a DS1 signal loopback storage unit to return the DS1 signal, a DS3 signal loopback storage unit to return the DS3 signal in an original input signal format, a selecting unit to select any one of DS3 loopback signals from the multiplexing/demultiplexing unit and the DS3 signal loopback storage unit, a protected detecting unit to output, when detecting loopback execution/cancellation information a plurality of times, a result of detection showing that loopback is to be executed or canceled, and a loopback control unit to make a control for loopback execution or loopback cancellation to the DS1 signal loopback storage unit, the DS3 signal loopback storage unit, and the selecting unit depending upon the result of detection.

9 Claims, 21 Drawing Sheets

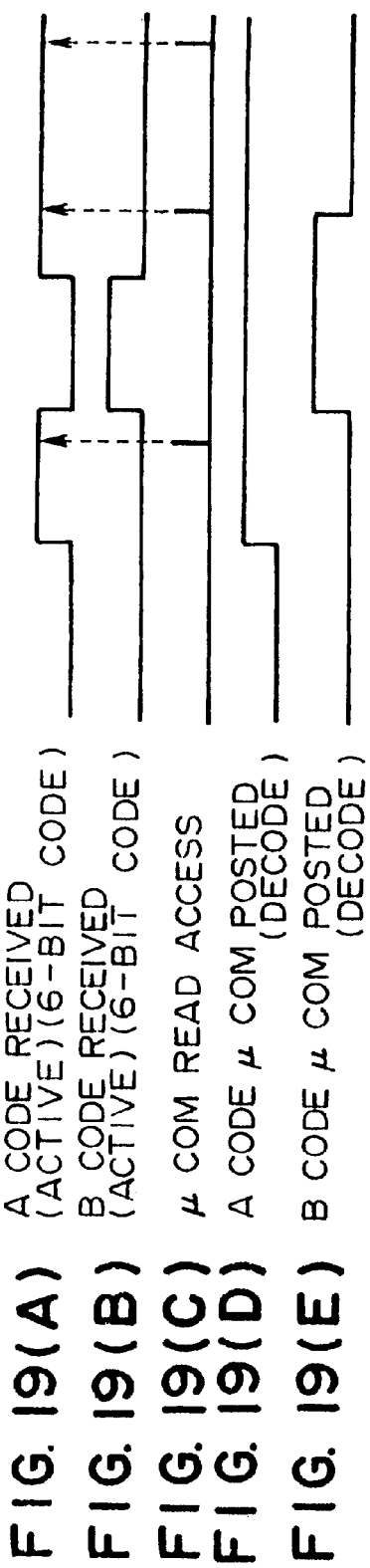
FIG. 19(A) A CODE RECEIVED (ACTIVE)(6-BIT CODE)
FIG. 19(B) B CODE RECEIVED (ACTIVE)(6-BIT CODE)
FIG. 19(C) μ COM READ ACCESS
FIG. 19(D) A CODE μ COM POSTED (DECODE)
FIG. 19(E) B CODE μ COM POSTED (DECODE)

SIGNAL LOOPBACK DEVICE

BACKGROUND OF THE INVENTION (1) Field of the Invention

The present invention relates to a signal loopback device for use in, for example, a remote supervisory control by returning a signal, and in particular to a signal loopback device suitable for use in a DS3 signal loopback conforming to North American DS3 C-bit parity system (TR-NWT-000499 Issue5).

Due to a lack of additional available bits, it is difficult to adapt a conventional North American DS3 signal to more enhanced network surveillance such as remote supervisory control. In order to overcome the problem, Bellcore (North America) has recommended the DS3 C-bit parity system.

In the system, by using a C-bit in the DS3 signal originally serving as a stuff bit, it is possible to transmit various information such as office alarm, a data link signal, and so forth.

(2) Description of the Related Art

In conventional maintenance of communication equipment, a loopback test is made to directly return output from a transmitting configuration of the communication equipment to a receiving configuration, thereby deciding whether or not the communication equipment normally functions.

Further, a system using a stuff bit is employed to transmit a loopback control signal, and a loopback circuit is realized by a selector circuit to select an input and returned signal and a normal output signal in the ratio of 2:1.

Meanwhile, an erroneous loopback control must be avoided as far as possible because the erroneous loopback control instantaneously interrupts a communication line. In particular, it is necessary to consider, for example, protection against a malfunction due to an error (degradation in line quality, and so forth).

In addition, since a loopback execution/cancellation signal is sent for each channel (CH), a measure for each channel is required in a detecting circuit (hardware) in consideration of a possible failure in a remote station (control station) with the loopback control uncanceled. Besides, it is also necessary to detect the failure of the remote station by any means, and clear a loopback control state prior to the failure by the failure detection.

With attention to the signal loopback conforming to the DS3 C-bit parity system, a DS3 signal is sent at a very high speed of 44.736 MHz, and a pulse mask for an output waveform is typically generated directly from a logic circuit such as LSI. Thus, it is required to avoid distortion of the output waveform. In clock switching by the conventional selector, different logic circuits are required for loopback execution and a normal operation so that a variation is naturally caused in distortion of the output waveform, resulting in a variation in characteristics.

Further, when the input DS3 signal to be looped back is returned by the logic circuit, the signal is typically returned after a bipolar signal is decoded into an NRZ (Non-Return to Zero) signal in a decoder circuit. However, there is a problem in that it is more desirable to return the signal without any signal processing.

SUMMARY OF THE INVENTION

In view of the foregoing problems, it is an object of the present invention to provide a signal loopback device which can ensure protection against a malfunction in consideration of erroneous signal detection due to degradation in circuit quality, can independently detect for each channel a loopback execution/cancellation signal sent for each channel by common hardware, and can also detect a failure of a remote station, thereby clearing a loopback control state prior to the failure.

According to the present invention, for achieving the above-mentioned objects, there is provided a signal loopback device including a multiplexing/demultiplexing unit to carry out multiplexing/demultiplexing between a DS3 signal serving as a digital signal conforming to a DS3 C-bit parity system and a DS1 signal serving as a digital signal having a lower speed than that of the DS3 signal, a DS1 signal loopback storage unit mounted on the side of DS1 signal input-output of the multiplexing/demultiplexing unit to temporarily contain the DS1 signal, and read the stored DS1 signal, thereby returning the DS1 signal, a DS3 signal loopback storage unit mounted on the side of DS3 signal input-output of the multiplexing/demultiplexing unit to temporarily contain the DS3 signal, and read the stored DS3 signal, thereby returning the DS3 signal in an original input signal format, a selecting unit to select any one of DS3 signal output from the multiplexing/demultiplexing unit and a DS3 loopback signal from the DS3 signal loopback storage unit, a protected detecting unit to output, when detecting loopback execution-cancellation information from a C-bit in the DS3 signal plurality of times, a result of detection showing that loopback is to be executed or canceled, and a loopback-control unit to make a control for loopback execution or loopback cancellation to the DS1 signal loopback storage unit, the DS3 signal loopback storage unit, and the selecting unit depending upon the result of detection in the protected detecting unit.

Thus, according to the signal loopback device according to the present invention, even in a state in which an error occurs in a line (degradation in, for example, line quality occurs), loopback execution/cancellation can be ensured, resulting in an advantage that an erroneous control of the loopback can be prevented. In addition, signal output can be made without clock switching by the selecting unit to select any one of the DS3 signal output from the multiplexing/demultiplexing unit and the DS3 loopback signal from the DS3 signal loopback storage unit, resulting in no variation in output waveform. Thus, there is another advantage in that an output waveform can be kept constant irrespective of whether the loopback is in execution or left unexecuted.

On the other hand, there is provided a signal loopback device according to the present invention including a loopback unit capable of temporarily containing a digital input signal input through an input line, and returning the digital input signal in an original input signal format to an output line for loopback, a protected detecting unit to output, when detecting loopback execution/cancellation information from the digital input signal plurality of times, a result of detection showing that the loopback is to be executed or canceled, and a loopback control unit to make a control for loopback execution or loopback cancellation to the loopback unit depending upon the result of detection in the protected detecting unit.

Therefore, according to the signal loopback device of the present invention, the loopback unit includes a storage unit to temporarily contain the digital input signal, the storage unit is written according to a write clock in synchronization with a receive clock, and the storage unit is read according a read clock in synchronization with the receive clock. As a result, there is another advantage in that a loss of data can be prevented.

BRIEF DESCRIPTION OF THE DRAWINGS

FIGS. 19(A) to 19(E) are time charts showing simplified control operations of an NM interface unit with respect to FEAC codes in the embodiment of the present invention;

FIGS. 26(A) to 20(C) are diagrams showing the operation of transmission of a C-13 code in a DS3 C-bit parity system.

DESCRIPTION OF THE PREFERRED EMBODIMENTS

(a) Description of Aspect of the Invention

A description will now be given of an aspect of the present invention referring to the accompanying drawings.

Figure 1:
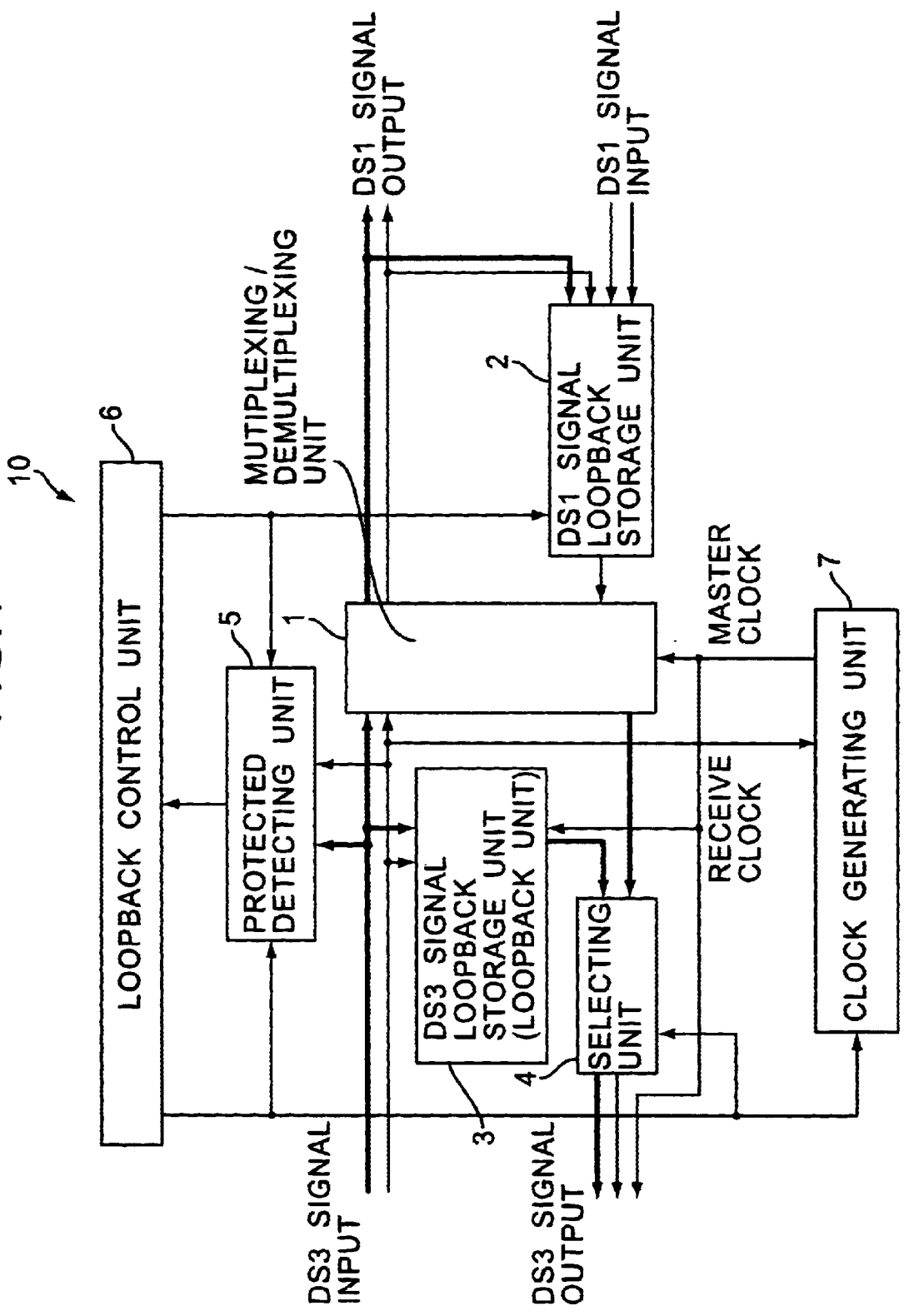
FIG. 1 is a block diagram showing an aspect of the present invention.

FIG. 1 is a block diagram showing the aspect of the present invention. A signal loopback device 10 shown in FIG. 1 includes a multiplexing/demultiplexing unit 1, a DS1 signal loopback storage unit 2, a DS3 signal loopback storage unit 3, a selecting unit 4, a protected detecting unit 5, a loopback control unit 6, and a clock generating unit 7.

The multiplexing/demultiplexing unit 1 carries out multiplexing/demultiplexing between a DS3 signal serving as a digital signal conforming to a DS3 C-bit parity system and a DS1 signal serving as a digital signal having a lower speed than that of the DS3 signal.

The DS1 signal loopback storage unit 2 is mounted on the side of DS1 signal input-output of the multiplexing/demultiplexing unit 1 to temporarily contain the DS1 signal, and read the stored DS1 signal, thereby returning the DS1 signal.

The DS3 signal loopback storage unit 3 is mounted on the side of DS3 signal input-output of the multiplexing/demultiplexing unit 1 to temporarily contain the DS3 signal, and read the stored DS3 signal, thereafter returning the DS3 signal in an original input signal format.

The selecting unit 4 selects any one of DS3 signal output from the multiplexing/demultiplexing unit 1 and a DS3 loopback signal from the DS3 signal loopback storage unit 3.

When the protected detecting unit 5 detects loopback execution/cancellation information from a C-bit in the DS3 signal plurality of times, the protected detecting unit 5 outputs a result of detection showing that loopback is to be executed or canceled.

The clock generating unit 7 generates a read clock for the DS3 signal loopback storage unit 3, and an operation clock for a multiplexing unit in the multiplexing/demultiplexing unit 1. Preferably, the clock generating unit 7 is configured as a PLL circuit having a reference clock oscillating unit, a clock selectable phase comparing unit, and a clock oscillating unit.

The clock selectable phase comparing unit selects any one of a receive clock and a reference clock from the reference clock oscillating unit to output a result of phase comparison of the selected clock.

Therefore, according to the present invention, the signal loopback device includes the multiplexing/demultiplexing unit 1 to carry out the multiplexing/demultiplexing between the DS3 signal serving as the digital signal conforming to the DS3 C-bit parity system and the DS1 signal serving as the digital signal having the lower speed than that of the DS3 signal, the DS1 signal loopback storage unit 2 mounted on the side of DS1 signal input-output of the multiplexing/demultiplexing unit 1 to temporarily contain the DS1 signal, and read the stored DS1 signal, thereby returning the DS1 signal, the DS3 signal loopback storage unit 3 mounted on the side of DS3 signal input-output of the multiplexing/demultiplexing unit 1 to temporarily contain the DS3 signal, and read the stored DS3 signal, thereby returning the DS3 signal in an original input signal format, the selecting unit 4 to select any one of the DS3 signal output from the multiplexing/demultiplexing unit 1 and the DS3 loopback signal from the DS3 signal loopback storage unit 3, the protected detecting unit 5 to output, when detecting the loopback execution/cancellation information from the C-bit in the DS3 signal plurality of times, the result of detection showing that the loopback is to be executed or canceled, and the loopback control unit 6 to make a control for loopback execution or loopback cancellation to the DS1 signal loopback storage unit 2, the DS3 signal loopback storage unit 3, and the selecting unit 4 depending upon the result of detection in the protected detecting unit 5. As a result, even in a state in which an error occurs in a line (degradation in, for example, line quality occurs), loopback execution/cancellation can be ensured, resulting in an advantage that an erroneous control of the loopback can be prevented. In addition, signal output can be made without clock switching by the selecting unit 4 to select any one of the DS3 signal output from the multiplexing/demultiplexing unit 1 and the DS3 loopback signal from the DS3 signal loopback storage unit 3, resulting in no variation in output waveform. Thus, there is another advantage in that an output waveform can be kept constant irrespective of whether the loopback is in execution or left unexecuted.

(b) Description of One Embodiment of the Invention

A description will now be given of an embodiment of the present invention referring to the accompanying drawings.

Figure 21:
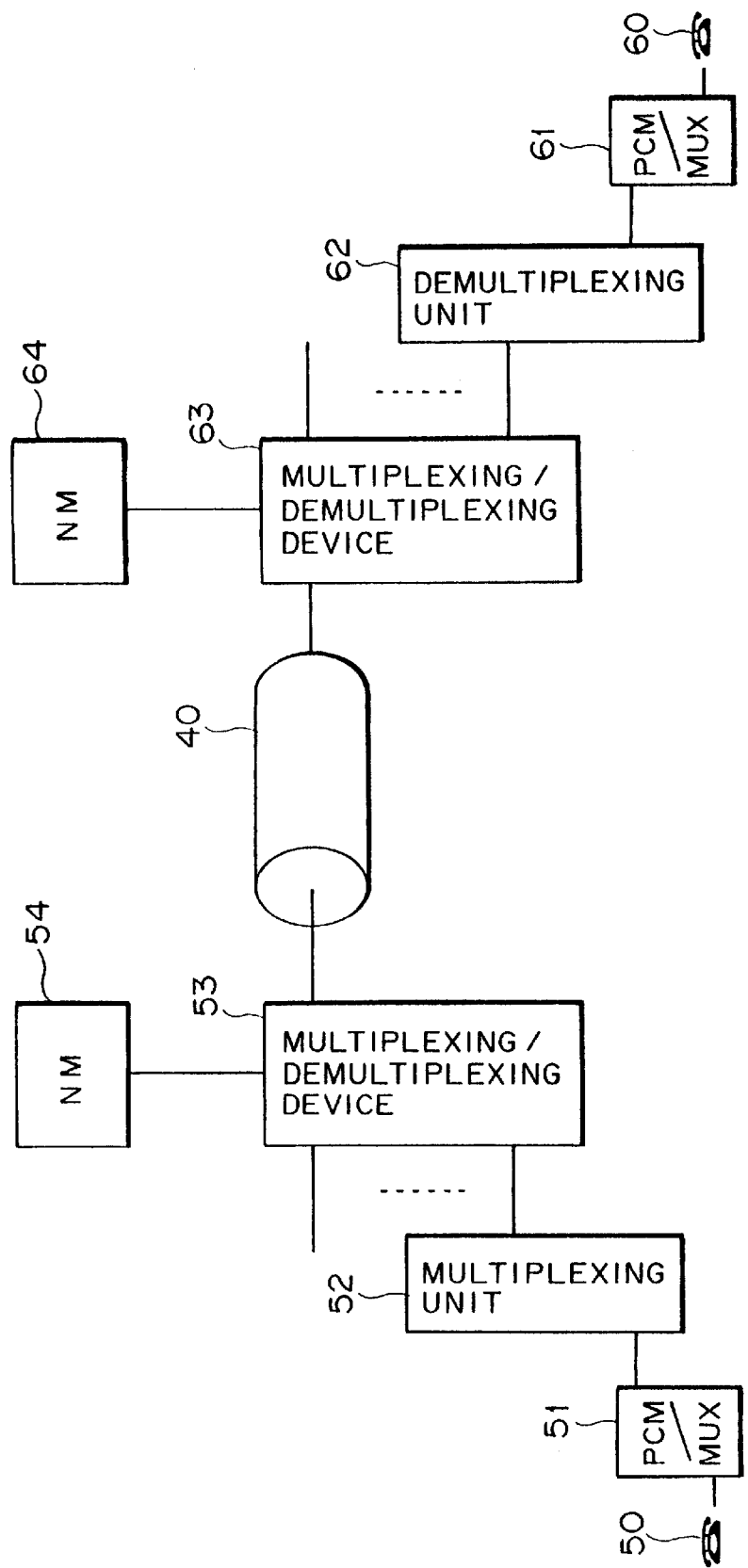
FIG. 21 is a diagram showing a simplified network to which one embodiment of the present invention is applied.

A signal loopback device according to the embodiment is installed in a multiplexing/demultiplexing device dedicated to a basic system. For example, as shown in FIG. 21, an electric signal from a telephone 50 is converted into a signal having a frequency of 64 kHz by a PCM/MUX 51, thereafter being converted into a DS1 signal having a frequency of 1.544 MHz by a multiplexing unit (MUX unit) 52. Subsequently, DS1 input signals are multiplexed in a multiplexing/demultiplexing device 53 to provide a DS3 signal having a frequency of 44.736 MHz so that the DS3 signal directly travels over a basic system 40, or is transmitted through a synchronous optical network (SONET) (Synchronous Digital Hierarchy [SDH]). Thereafter, the DS3 signal is converted in a remote multiplexing/demultiplexing device 63 into DS1 signals.

In reverse, the DS3 signal from the remote multiplexing/demultiplexing device 53 is sent through the basic system 40, and is converted in the multiplexing/demultiplexing device 63 into the DS1 signals. Subsequently, the DS1 signals are sequentially converted into lower speed signals, and finally arrive at a telephone, thereby establishing two-way transmission. It is to be noted that a terminal should not be limited to the telephone, and a computer terminal may be employed to perform the same signal processing in the above network.

Further, the remote multiplexing/demultiplexing device 63 is connected to a network monitoring unit (NM) 64. A signal for loopback execution or loopback cancellation can be transmitted through the multiplexing/demultiplexing device 63 and the basic system 40 to the multiplexing/demultiplexing device 53. In a method described infra, the multiplexing/demultiplexing device 53 can execute or cancel the signal loopback.

Thus, the network monitoring unit (NM) 64 can make a remote supervisory control.

As stated above, the signal loopback device is installed in the multiplexing/demultiplexing device to carry out the multiplexing/demultiplexing of signal for the basic system.

Figure 2:
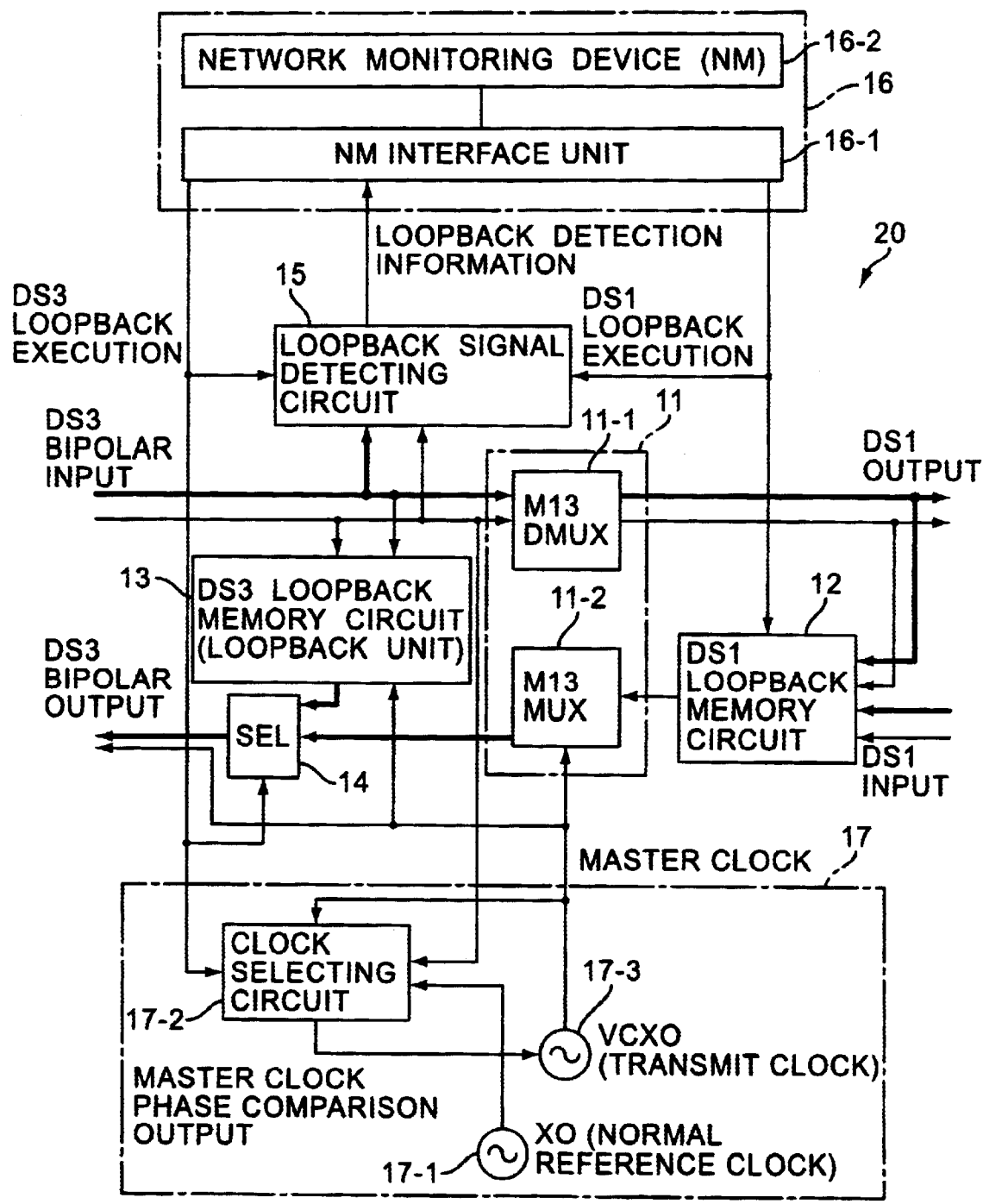
FIG. 2 is a block diagram showing one embodiment of the present invention.

FIG. 2 is a block diagram showing the embodiment of the signal loopback device of the present invention. As described above, the signal loopback device 20 shown in FIG. 2 is built in the multiplexing/demultiplexing devices (53, 63), and includes an M13 DMUX/M13 MUX 11, a DS1 loopback memory circuit 12, a DS3 loopback memory circuit 13, a selector 14, a loopback signal detecting circuit 15, a control unit 16, and a clock generating unit 17.

Here, the M13 DMUX/M13 MUX 11 includes an M13 DMUX (M13 demultiplexer) 11-1, and an M13 MUX (M13 multiplexer) 11-2. The M13 DMUX 11-1 has the function of demultiplexing the DS3 signal to provide DS1*28CH, and the M13 MUX 11-2 has the function of multiplexing the DS1*28CH to provide the North American DS3 signal.

Therefore, the M13 DMUX 11-1 and the M13 MUX 11-2 have the function as a multiplexing/demultiplexing unit to carry out the multiplexing/demultiplexing between the DS3 signal serving as the digital signal conforming to the DS3 C-bit parity system and the DS1 signal serving as the digital signal having the speed lower than that of the DS3 signal.

The DS1 loopback memory circuit 12 takes as inputs normally multiplexed DS1 data 28CH and loopback DS1 data (identical with an output DS1 signal) 28CH to write the input DS1 data on a corresponding channel memory for asynchronous multiplexing. Further, the DS1 loopback memory circuit 12 compares phases of an input DS1 clock and a DS1 clock generated from a master clock to post a result of comparison to the M13 MUX 11-2 as an asynchronous stuff control signal, thereby realizing the asynchronous multiplexing. Therefore, the DS1 loopback memory circuit 12 has the function as the DS1 signal loopback storage unit mounted on the side of DS1 signal input-output of the multiplexing/demultiplexing unit to temporarily contain the DS1 signal and read the stored DS1 signal, thereby returning the DS1 signal.

The DS3 loopback memory circuit 13 temporarily contains the loopback DS3 data (such as DS3 bipolar data) in order to return the loopback DS3 data in the same transmission type as data transmission type of the transmitted data.

Figure 3:
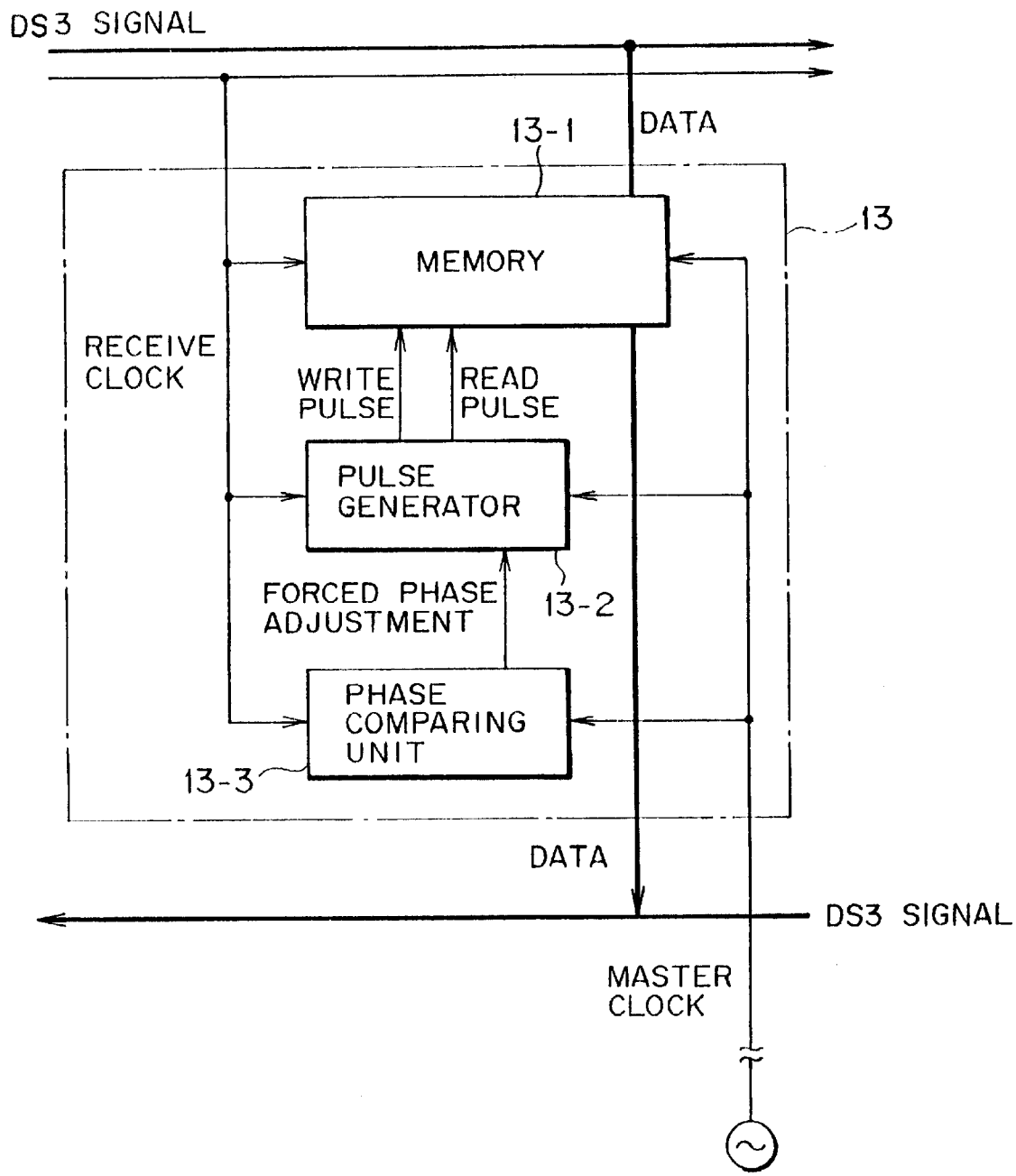
FIG. 3 is a block diagram showing a DS3 loopback memory circuit in the embodiment of the present invention.

Here, FIG. 3 is a block diagram showing a schematic configuration of the DS3 loopback memory circuit 13 in the embodiment of the present invention. The DS3 loopback memory circuit 13 shown in FIG. 3 includes a memory 13-1, a pulse generator 13-2, and a phase comparing unit 13-3.

The memory 13-1 temporarily contains the DS3 signal, and holds the DS3 signal temporarily input into the DS3 loopback memory circuit 13 at a time of DS3 signal loopback.

Figure 4:
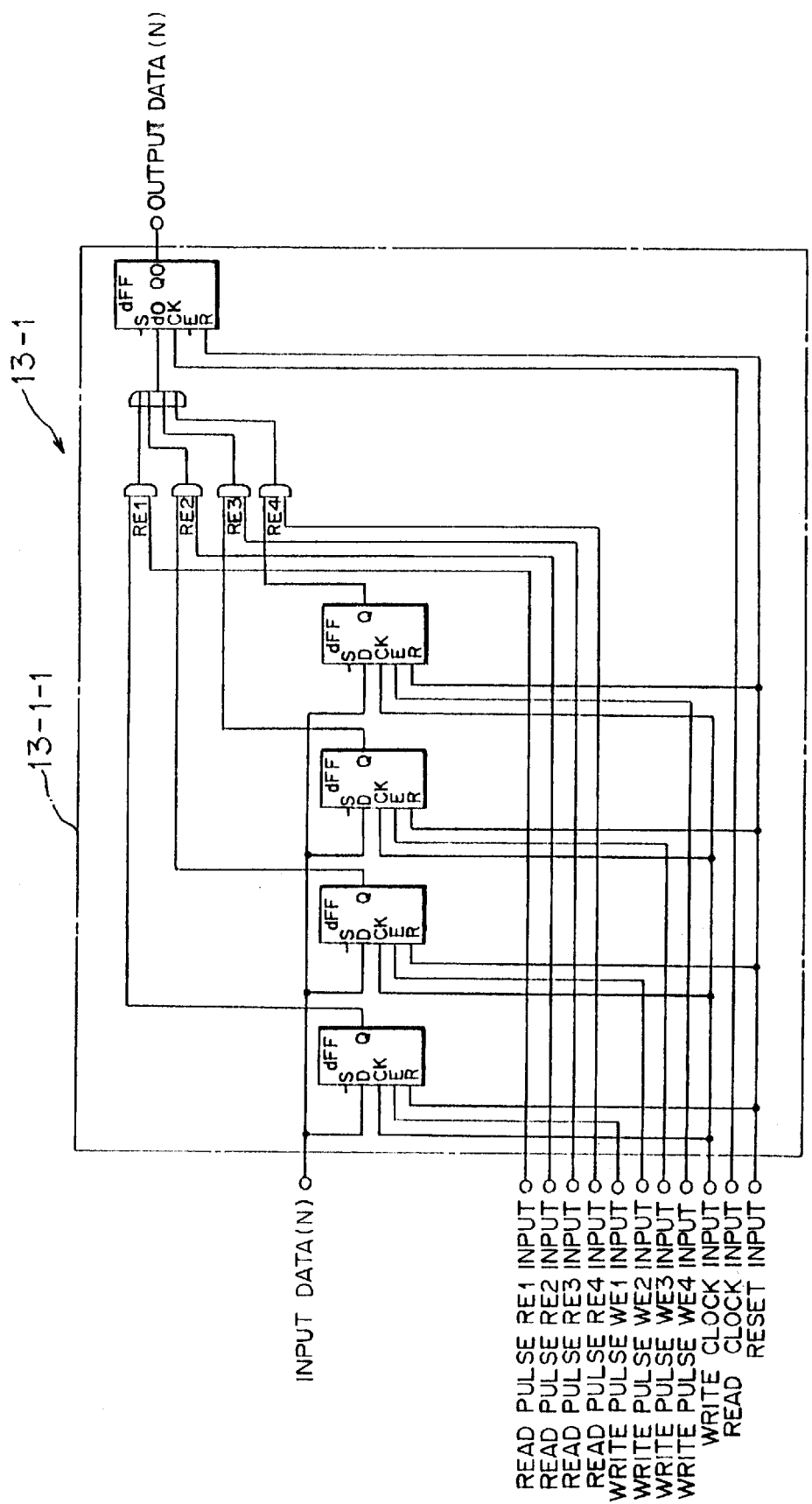
FIG. 4 is a diagram showing an N-bipolar data 4-bit memory in the embodiment of the present invention.
Figure 5:
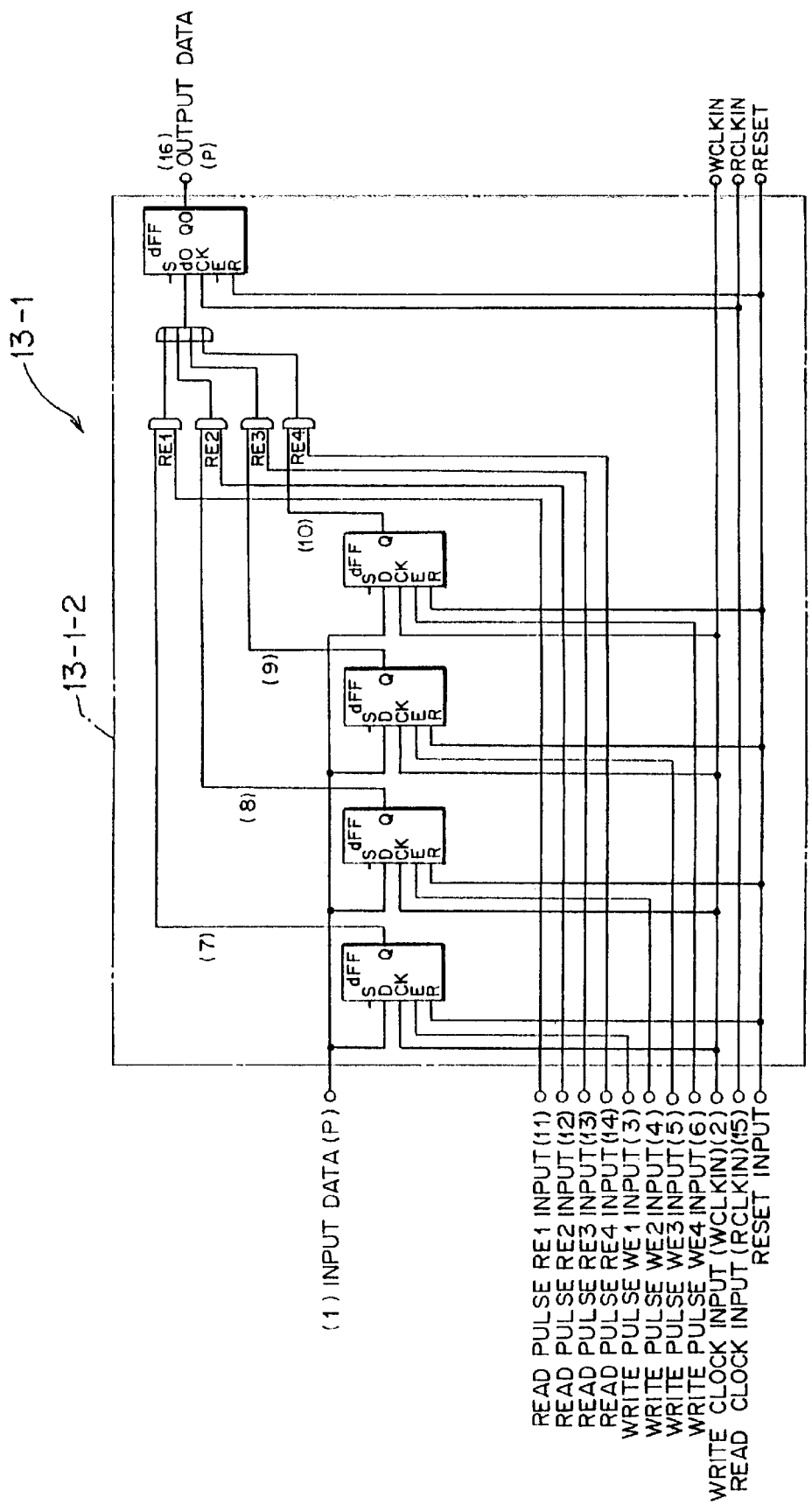
FIG. 5 is a diagram showing a P-bipolar data 4-bit memory in the embodiment of the present invention.

Here, FIGS. 4 and 5 are diagrams showing illustrative P/N-bipolar data 4-bit memory circuits used as the memory 13-1. The P/N-bipolar data 4-bit memory circuits (13-1-1, 13-1-2) shown in FIGS. 4 and 5 respectively include a shift register, an OR circuit, and an AND circuit.

The input DS3 bipolar signals are sequentially stored in the P/N-bipolar data 4-bit memory circuits (13-1-1, 13-1-2) according to timing of a write pulse generated depending upon a receive clock. On the other hand, the P/N-bipolar data 4-bit memory circuits (13-1-1, 13-1-2) sequentially select data in the shift register according to a read pulse generated depending upon a master clock (transmit clock), thereby outputting data in synchronization with the read clock (master clock).

Put another way, though a detailed description will later be given of clock/pulse, the P/N-bipolar data (DS3 signals) are stored in the memory circuits according to the timing of the write pulse generated depending upon the receive clock, while the data are read from the memory circuits according to the read timing pulse generated depending upon the master clock.

In other words, the data is written on a flip-flop (FF) described infra in the memory according to the write timing pulse. The data is read from the flip-flop (FF) in the memory 3-1 according to the read timing pulse.

Figure 6:
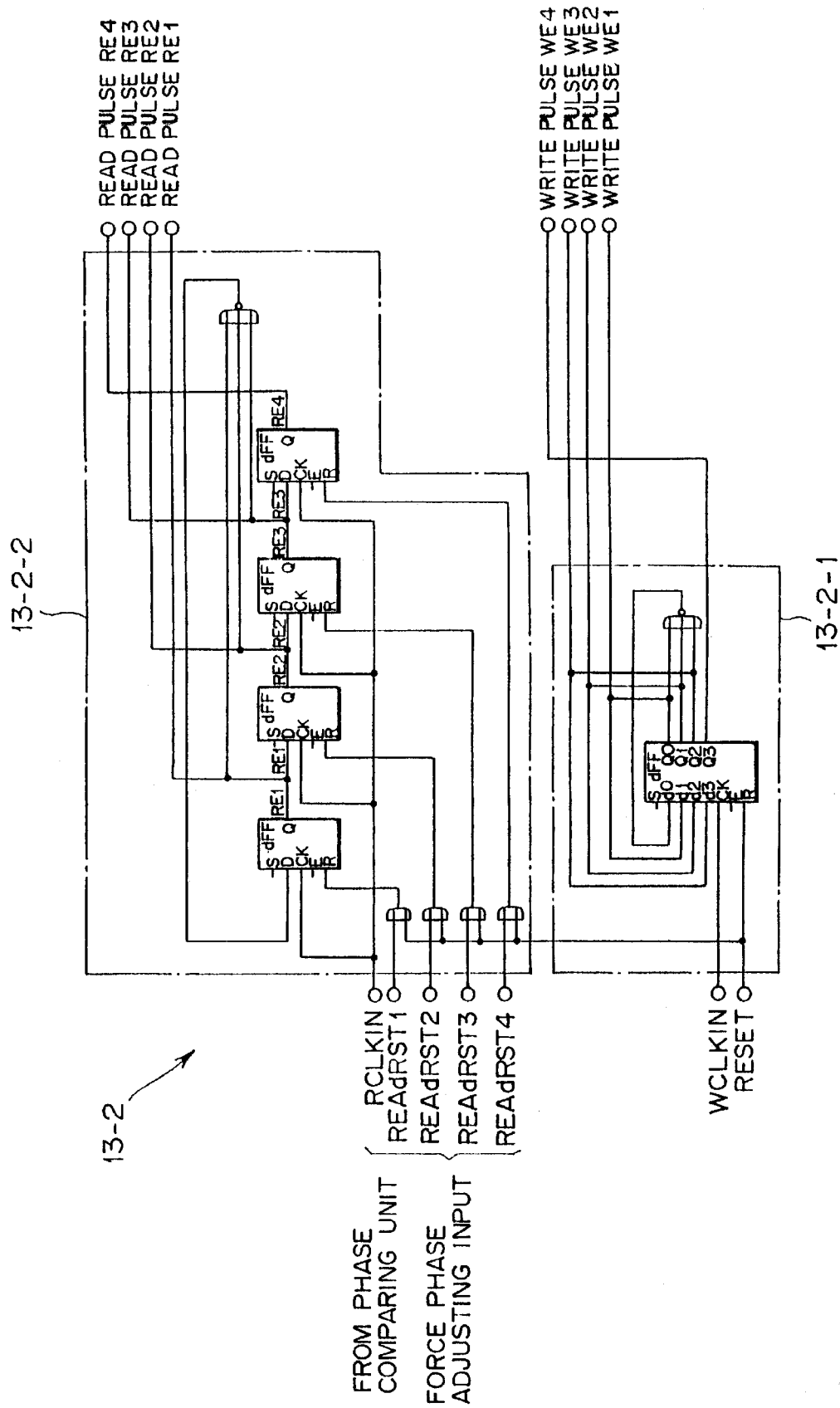
FIG. 6 is a diagram showing a pulse generator in the embodiment of the present invention.

The pulse generator 13-2 generates the write pulse used to write the DS3 bipolar signal on the memory 13-1, and the read pulse used to read the DS3 bipolar signal from the memory 13-1. For this purpose, the pulse generator 13-2 includes, for example, a write pulse generator 13-2-1 and a read pulse generator 13-2-2 as shown in FIG. 6.

Here, the write pulse generator 13-2-1 is configured as a ring counter. The write pulse generator 13-2-1 generates the write timing pulse (write pulse) depending upon the write clock.

In the N/P-bipolar data 4-bit memories 13-1-1 and 13-1-2, the data are sequentially stored in the respective flip-flops (FFs) depending upon the timing of the write pulse fed from the pulse generator 13-2.

On the other hand, the read pulse generator 13-2-2 is configured as a ring counter including a shift register and a gate. The read pulse generator 13-2-2 generates the read pulse by the read clock.

In the N/P-bipolar data 4-bit memories 13-1-1 and 13-1-2, the data are sequentially read from the respective flip-flops (FFs) depending upon the timing of the read pulse fed from the pulse generator 13-2.

The read pulse generator 13-2-2 can adjust a read position by forcedly resetting the read position to an optimal position in response to forced phase adjusting input from the phase comparing unit 13-3.

The phase comparing unit 13-3 monitors phases of the write pulse and the read pulse to output the forced phase adjusting signal (reset signal) to the read pulse generator 13-2-2 when the read timing is positioned close to the write timing.

Figure 7:
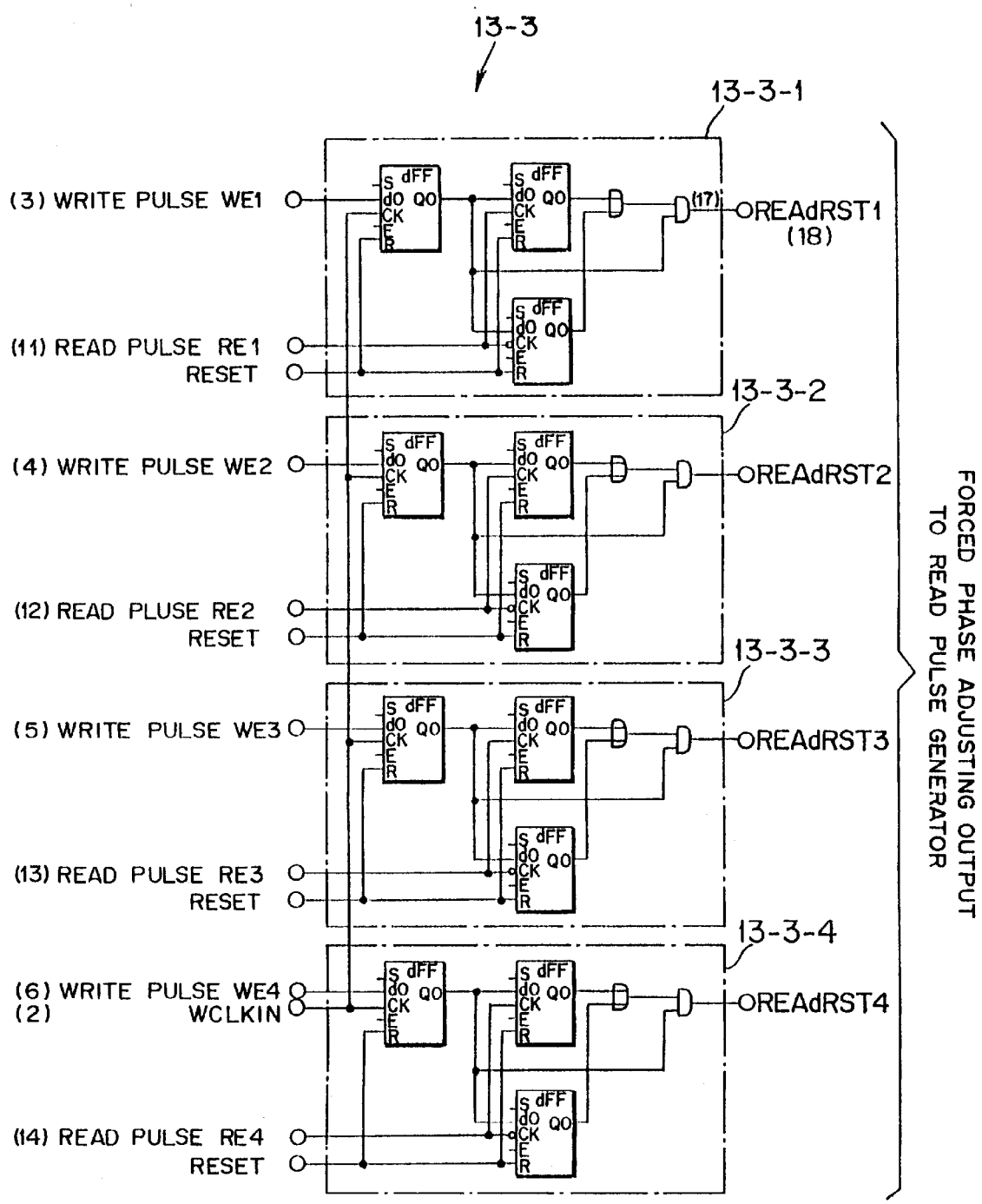
FIG. 7 is a diagram showing a phase comparing unit in the embodiment of the present invention.

FIG. 7 is a diagram showing one illustrative phase comparing unit. The phase comparing unit shown in FIG. 7 includes four phase comparator circuits (13-3-1 to 13-3-4) corresponding to the 4-bit memory circuits. The respective phase comparator circuits (13-3-1 to 13-3-4) are provided with three flip-flops (FFs) as a center. The phase comparing unit includes the four phase adjusting circuits (13-3-1 to 13-3-4) corresponding to the P/N-bipolar data 4-bit memories. The respective phase adjusting circuits are operated for the flip-flops in the read pulse generator 13-2-2.

In other words, for example, the phase comparator circuit 13-3-1 compares the phases of the write pulse and the read pulse with respect to the flip-flop FF1 in the memory 13-1, and outputs the forced phase adjusting signal to the read pulse generator to generate a read pulse for reading of data from the flip-flop FF1 when a difference in phase between the write pulse and the read pulse is equal to a predetermined value or less.

Then, the read pulse generator is prevented from generating the read pulse for reading of the data from the flip-flop FF1 in response to the forced phase adjusting signal, and can generate the read pulse when the forced phase adjusting signal is canceled.

As stated above, the phase comparing unit 13-3 (or the respective phase comparator circuits 13-3-1 to 13-3-4) makes the phase comparison between the write pulse and the read pulse generated by the pulse generator 13-2, and has the function as a clock phase adjusting unit to monitor a phase relationship between the write clock and the read clock, and forcedly shift by a predetermined amount any one of the write clock and the read clock when a difference in phase between the write clock and the read clock is equal to a predetermined value or less.

Figure 15:
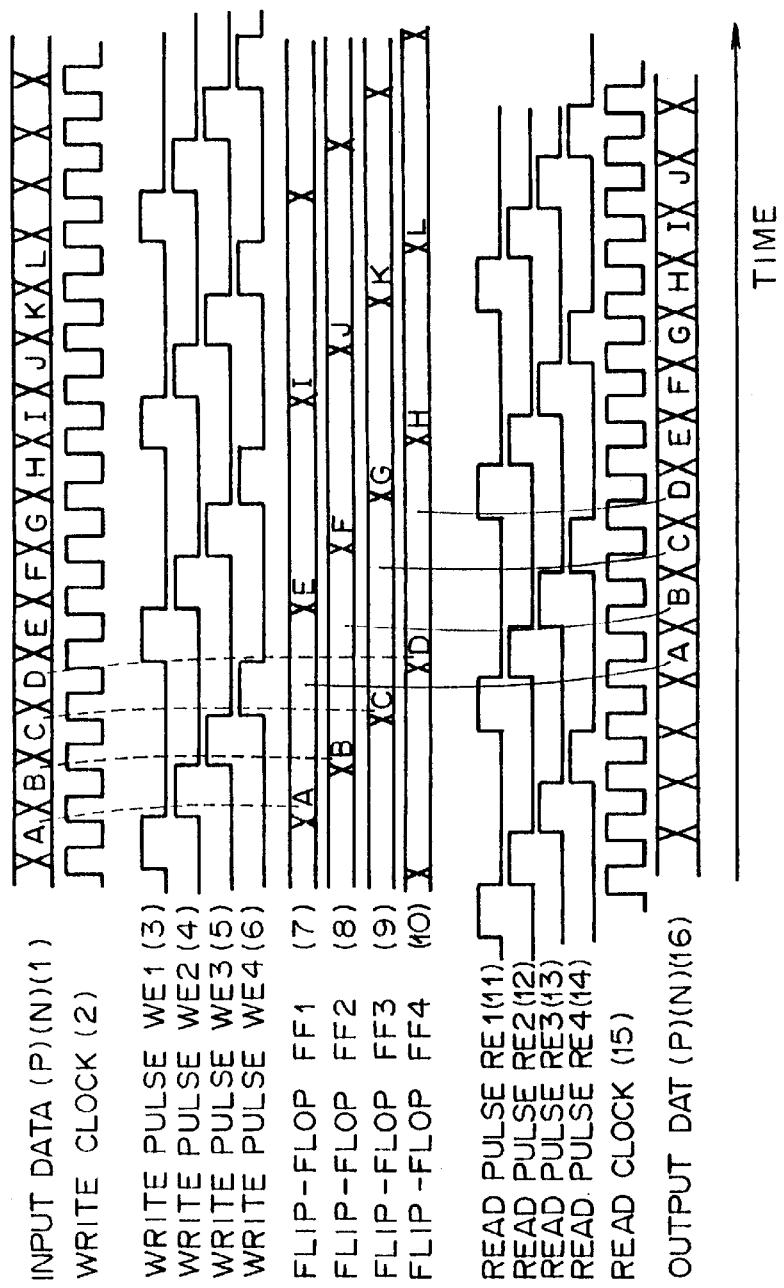
FIG. 15 is a time chart for explaining the operation of a loopback circuit in the embodiment of the present invention.
Figure 16:
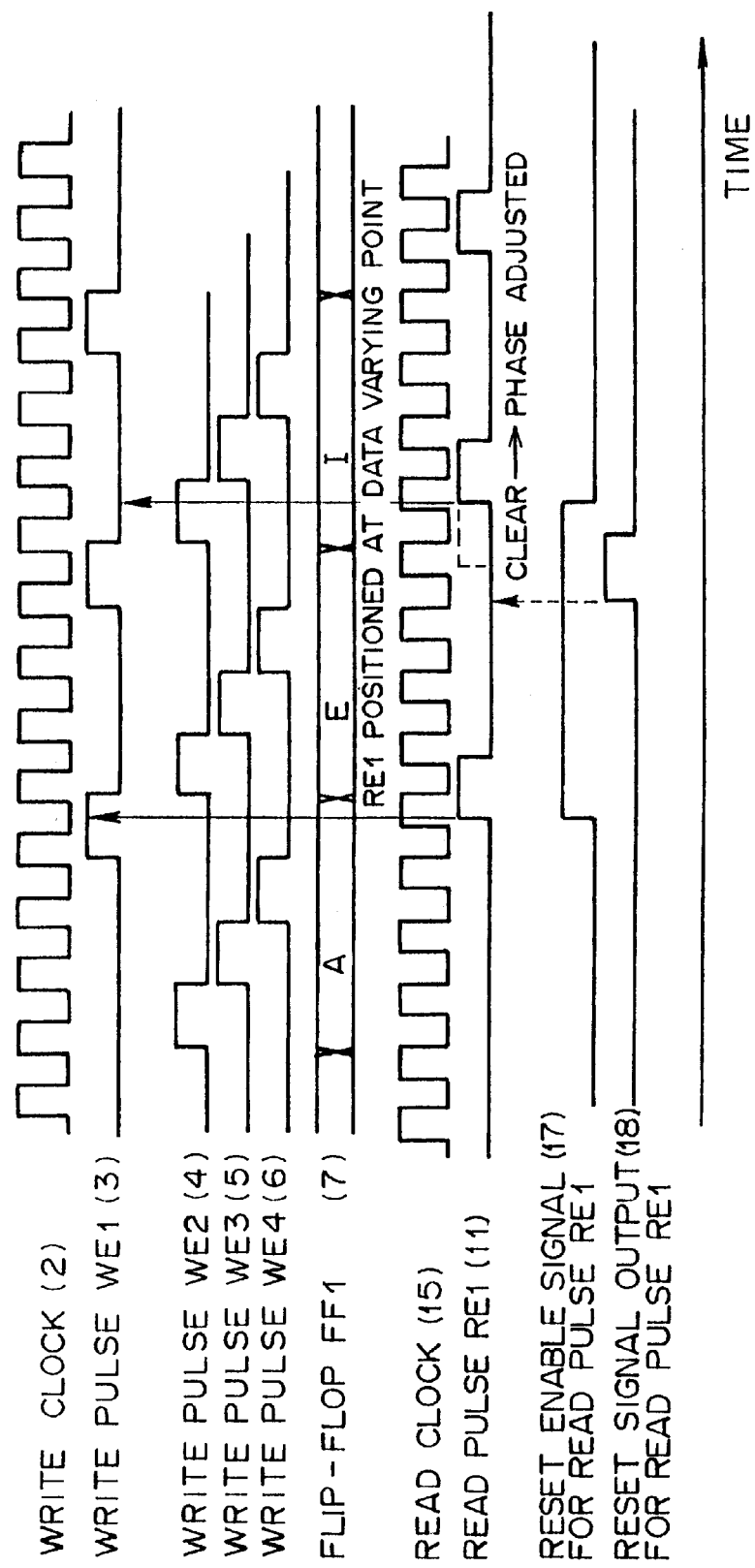
FIG. 16 is a time chart for explaining the operation of the loopback circuit in the embodiment of the present invention.
Figure 17:
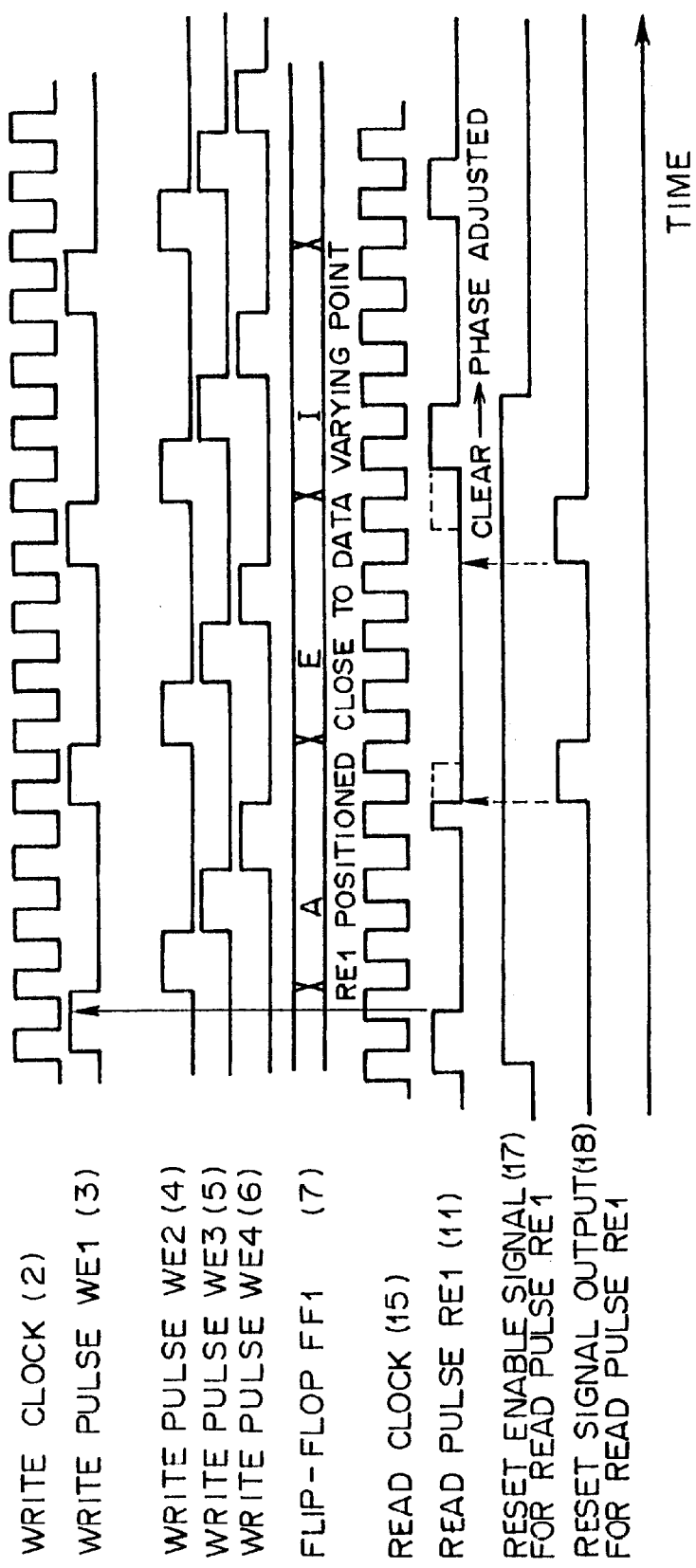
FIG. 17 is a time chart for explaining the operation of the loopback circuit in the embodiment of the present invention.

Here, FIGS. 15, 16, and 17 are time charts for explaining the operation of the DS3 loopback memory circuit 13 (reference numerals such as (1) to (16) shown in FIG. 15 being common to FIGS. 16 and 17).

FIG. 15 is the time chart showing the DS3 loopback memory circuit 13 in a normal operation. As shown in FIG. 15, input data ((P), (N), and A to L) are sequentially stored in the flip-flops (FF1 to FF4) in the shift register depending upon write pulses (WE1 to WE4) generated with reference to the receive clock. On the other hand, the data are sequentially read from the flip-flops (FF1 to FF4) in the shift register depending upon read pulses (RE1 to RE4) generated with reference to the transmit clock, resulting in loopback of output data ((P), (N), and A to L).

Further, FIG. 16 is the time chart for explaining the operation of the DS3 loopback memory circuit 13 when the read pulse RE1 is positioned immediately after the write pulse WE1, and the read pulse RE1 is positioned at a data varying point of the flip-flop (FF1).

In this case, the phase comparing unit 13-3 in the DS3 loopback memory circuit 13 detects that the read pulse RE1 is positioned at the data varying point, thereby outputting as the forced phase adjusting signal a reset enable signal for the read pulse RE1, and a reset signal for the read pulse RE1.

That is, when, in chronological order, the write pulse WE1 and the read pulse RE1 are positioned on the same timing with respect to the flip-flop FF1, the reset enable signal for the read pulse RE1 is output to shift the read pulse RE1 so as to output the read pulse RE1 according to desired timing.

As the forced phase adjusting input, the reset enable signal for the read pulse RE1 and the reset output signal for the read pulse RE1 are input into the read pulse generator to generate the read pulse RE1 in the pulse generator.

On the other hand, FIG. 17 is the time chart for explaining the operation of the DS3 loopback memory circuit 13 when the read pulse RE1 is positioned immediately before the write pulse WE1, that is, the read pulse RE1 is positioned, with respect to the write pulse WE1, at a data varying point of the flip-flop FF1.

The write pulse WE1 and the read pulse RE1 are input into the flip-flop FF1 depending on the same timing in chronological order, thereby outputting a reset enable signal for the read pulse RE1. Since the read pulse RE1 and the write pulse WE1 are positioned according to the same timing, the forced phase adjusting signal is output to adjust a phase of the read pulse RE1.

In such a manner, when the difference in phase between the clocks is equal to the predetermined value or less, it is possible to forcedly shift one of the clocks by the predetermined amount.

As described above, the phase comparing unit 13-3 monitors the phase relationship between the write pulse and the read pulse, and forcedly shifts by the predetermined amount any one of the write pulse and the read pulse when the difference in phase between the write pulse and the read pulse is equal to the predetermined value or less, resulting in the function as the clock phase adjusting unit.

Meanwhile, the selector 14 shown in FIG. 2 selects any one of the DS3 signal output from the M13 MUX 11-1 and the DS3 loopback signal from the DS3 signal loopback memory circuit 13.

In other words, the selector 14 selects any one of the DS3 signal output sent from the M13 MUX 11-1 in synchronization with the clock and the DS3 loopback signal sent from the DS3 signal loopback memory circuit 13 without clock switching.

Figure 8:
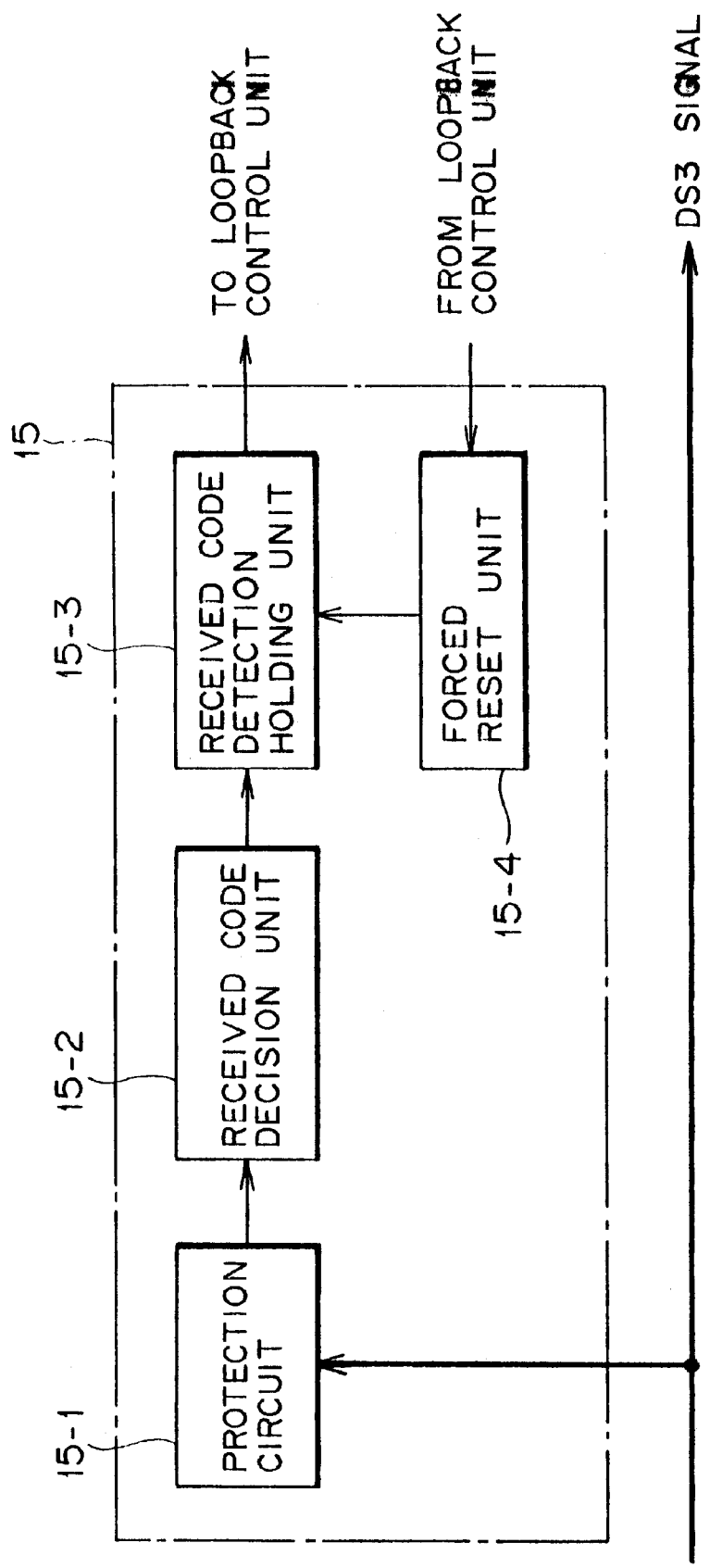
FIG. 8 is a block diagram of a loopback signal detecting circuit in the embodiment of the present invention.

The loopback signal detecting circuit 15 detects, for example, a loopback signal from a DS3 bipolar signal. For this purpose, as shown in FIG. 8, the loopback signal detecting circuit 15 includes a protection circuit 15-1, a received code decision unit 15-2, a received code detection holding unit 15-3, and a forced reset unit 15-4.

The protection circuit 15-1 detects C13 (a C-bit having a signal or information showing that, for example, loopback is to be executed/canceled) from the DS3 signal in the DS3 C-bit parity system. In detection of a predetermined code added to the C13, when the loopback execution/cancellation information is detected from the C-bit in the DS3 signal plurality of times, the protection circuit 15-1 outputs a result of detection showing that the loopback is to be executed or canceled.

That is, the protection circuit 15-1 allows a bit error to some extent in consideration of degradation of input DS3 signal quality in the line.

Figure 9:
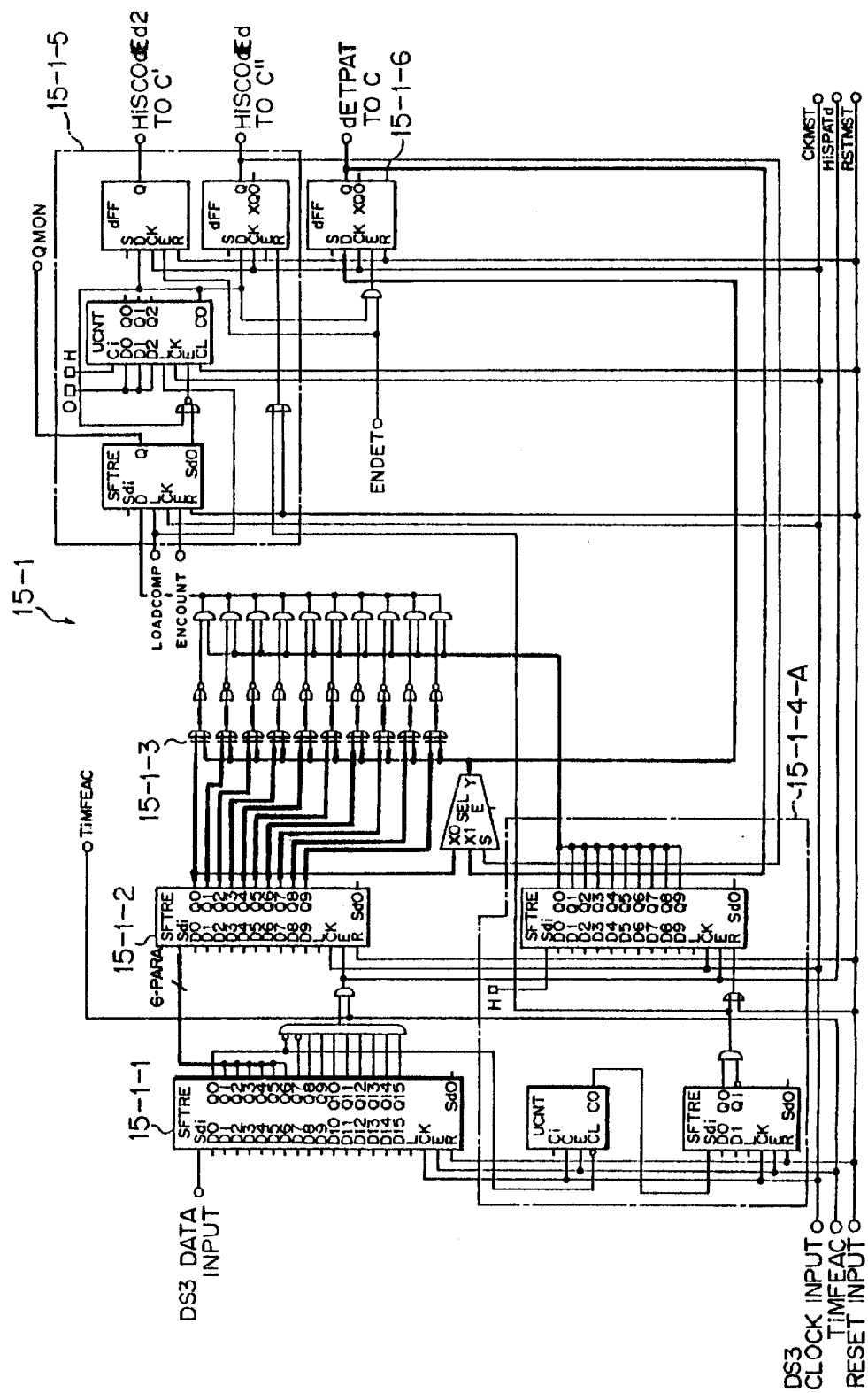
FIG. 9 is a diagram showing an essential configuration of a protection circuit in the embodiment of the present invention.

Here, FIG. 9 is a diagram showing one illustration of the protection circuit 15-1. The protection circuit 15-1 shown in FIG. 9 includes a serial pattern detecting unit 15-1-1, a 6-bit code 10-stage holding circuit 15-1-2, a code matching detecting unit 15-1-3, a detection circuit timing generating unit 15-1-4, a 7/10 matching counter and decision unit 15-1-5, and a detected code holding unit 15-1-6.

The protection circuit 15-1 shown in FIG. 9 takes as input the input DS3 signal (loopback control signal) in synchronization with the receive clock, and extracts a necessary FEAC bit according to a timing pulse (FTIME timing pulse abbreviated as TiMFEAC in the drawings) showing a position of the C13 on a DS3 frame.

The extracted FEAC bit is input into the serial pattern detecting unit 15-1-1, and 16-bit serial data "111111110xxxxxx0" (x: variable) is monitored starting from the leftmost side. Thereby, the protection circuit 15-1 makes a decision of a heading code, and concurrently converts the 6-bit code "xxxxxx" into parallel data (abbreviated as "6-PAPA" on the solid line in the drawing) which is input into the 6-bit parallel code 10-stage holding circuit 15-1-2.

Output from the 6-bit parallel code 10-stage holding circuit 15-1-2 is input into the code matching detecting unit 15-1-3 in which first to tenth matching/mismatching of the codes are sequentially detected under control of the detection circuit timing generating unit 15-1-4. A result of detection is input into the 7/10 matching counter and decision unit 15-1-5. The solid lines in FIG. 9 denote 6-bit parallel signals as in the above discussion.

Figure 10:
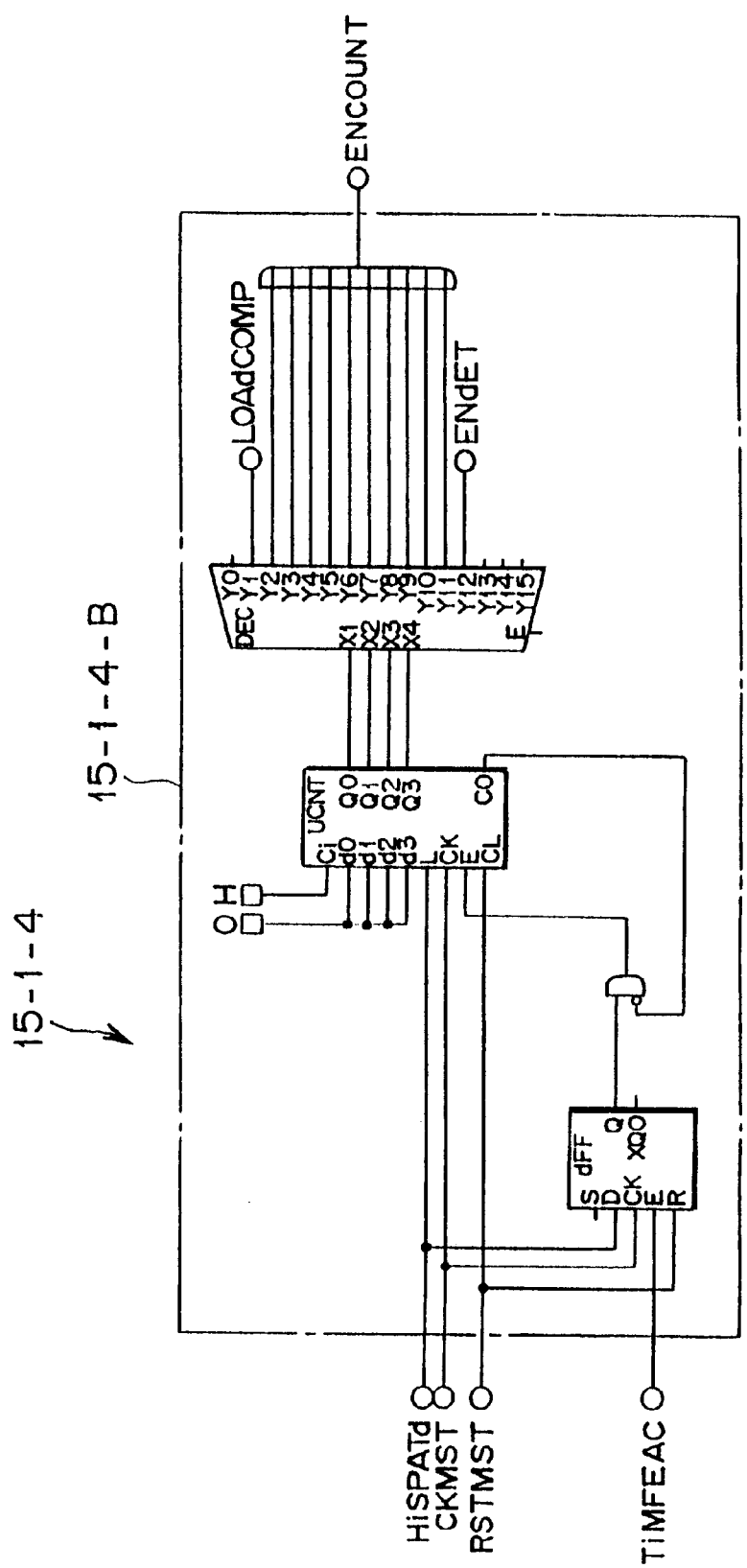
FIG. 10 is a diagram showing a second detecting circuit timing generating circuit in the embodiment of the present invention.

In cooperation, a first detecting circuit timing generating circuit 15-1-4-A shown in FIG. 9, and a second detecting circuit timing generating circuit 15-1-4-B shown in FIG. 10 can function as the detection circuit timing generating unit 15-1-4.

When the code is detected from the input DS3 signal in the serial pattern detecting unit 15-1-1, the detecting circuit timing generating circuit 15-1-4-A catches a code to be detected discretely. Further, the detecting circuit timing generating circuit 15-1-4-A generates, at any desired time, timings on which ten codes subsequently input in series are detected in the matching counter and decision unit.

On the other hand, depending upon a start of occurrence of the timing from the detecting circuit timing generating circuit 15-1-4-A, the detecting circuit timing generating circuit 15-1-4-B controls the timings on which the ten codes are detected in the 7/10 matching counter and decision unit, and so forth. Until codes are matched seven times or more in ten decisions, the code matching detecting unit 15-1-3 makes a decision of matching/mismatching by a comparison with the latest code.

When the detected codes are matched seven times or more, the detected code holding unit 15-1-6 holds the corresponding received codes, and inputs the codes as holding codes into a loopback execution decision unit 15-2-A, a loopback cancellation decision unit 15-2-B, and the received code decision unit 15-2. The results of detection in the 7/10 matching counter and decision unit 15-1-5 and the detected code holding unit 15-1-6 shown in FIG. 9 are input as the holding codes into the loopback execution decision unit 15-2-A, the loopback cancellation decision unit 15-2-B, and the received code decision unit 15-2 as shown in FIGS. 11 and 12 (the results of detection being fed from the detected code holding unit 15-1-6 to terminals C in FIG. 11, and terminals C', C" in FIG. 12).

In the drawings, the common component parts are shown by the same reference numerals.

The received code decision unit 15-2 makes a decision of a code extracted and detected from the DS3 signal in the protection circuit 15-1.

Figure 11:
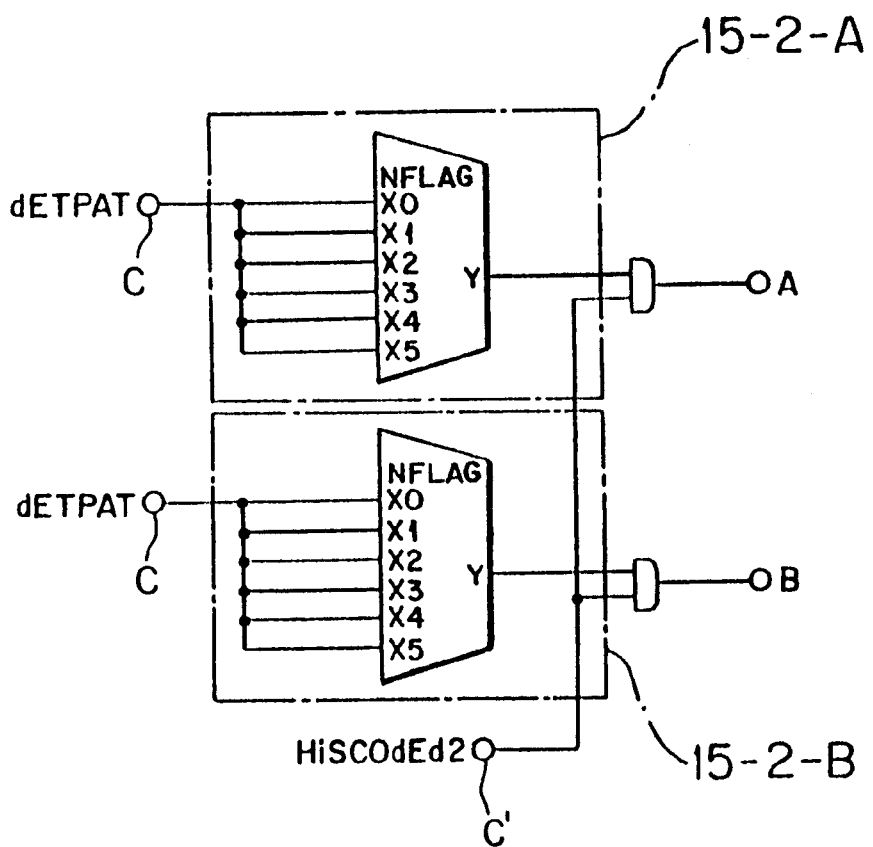
FIG. 11 is a diagram showing a loopback execution/cancellation decision unit in the embodiment of the present invention.
Figure 12:
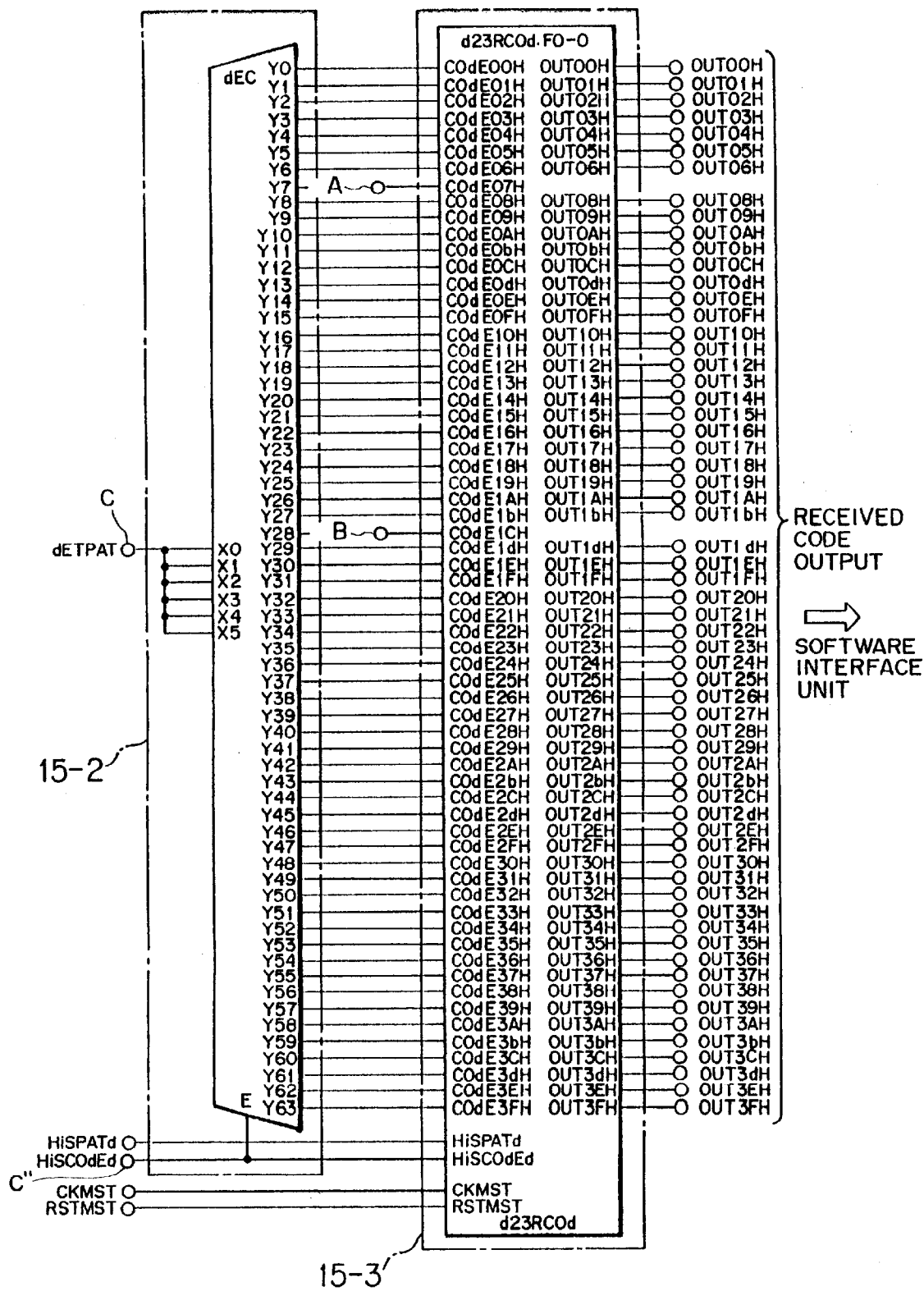
FIG. 12 is a diagram showing a received code decision unit and a received code detection holding unit in the embodiment of the present invention.

FIG. 11 is a diagram showing an embodiment of the received code decision unit 15-2. The received code decision unit 15-2 shown in FIG. 12 specifically decides whether the detected code is i) Alarm and Status, ii) In Band Loop Back, or iii) UNASSIGNED CODE in the FEAC code. On the other hand, FIG. 12 also shows the received code decision unit 15-2. The received code decision unit 15-2 shown in FIG. 11 can make a decision of whether the detected code is a loopback execution code or a loopback cancellation code.

The input terminals (terminals C) in FIGS. 11 and 12 take as inputs the detected codes from the matching counter and decision unit of the protection circuit 15-1 shown in FIG. 9. When the loopback execution code is detected in the loopback execution decision unit 15-2-A shown in FIG. 11, a result of detection is input into the received code detection holding unit 15-3 through a terminal A shown in FIG. 12. Further, when the loopback cancellation code is detected in the loopback cancellation decision unit 15-2-B, a result of detection is input into the received code detection holding unit 15-3 through a terminal B shown in FIG. 12.

That is, the loopback execution decision unit 15-2-A detects "111000," and the loopback cancellation decision unit 15-2-B detects "001110." The result of detection is input into the received code detection holding unit 15-3, and is used as a loopback detection/cancellation condition.

On the other hand, the received code decision unit 15-2 decodes the received code to input the received code into the received code detection holding unit 15-3.

The received code detection holding unit 15-3 holds the code whose decision is given.

FIG. 12 is a diagram showing an embodiment of the received code detection holding unit 15-3. The received code detection holding unit 15-3 shown in FIG. 12 can hold the received codes discretely (for example, for each channel).

The received code detection holding unit 15-3 has the function as a detection result holding unit to hold the result of detection showing that the loopback is to be executed or canceled.

That is, the received code detection holding unit 15-3 includes 62 types of "independent detection result holding circuits," and has the function of holding results of reception.

Output of the received code detection holding unit 15-3 is posted as independent output to an NM interface unit 16-1.

In other words, in the received code decision unit 15-2 and the received code detection holding unit 15-3, the loopback execution/cancellation signal transmitted for each channel is independently detected by the common hardware for each channel, thereby holding the detected code for each channel.

The forced reset unit 15-4 cancels the code held in the received code detection holding unit 15-3 depending upon a signal from the NM interface unit 16-1.

The forced reset unit 15-4 has the function as a forced reset unit to forcedly reset the result of detection held in the detection result holding unit when receiving a forced reset signal from the loopback control unit 6.

Figure 13:
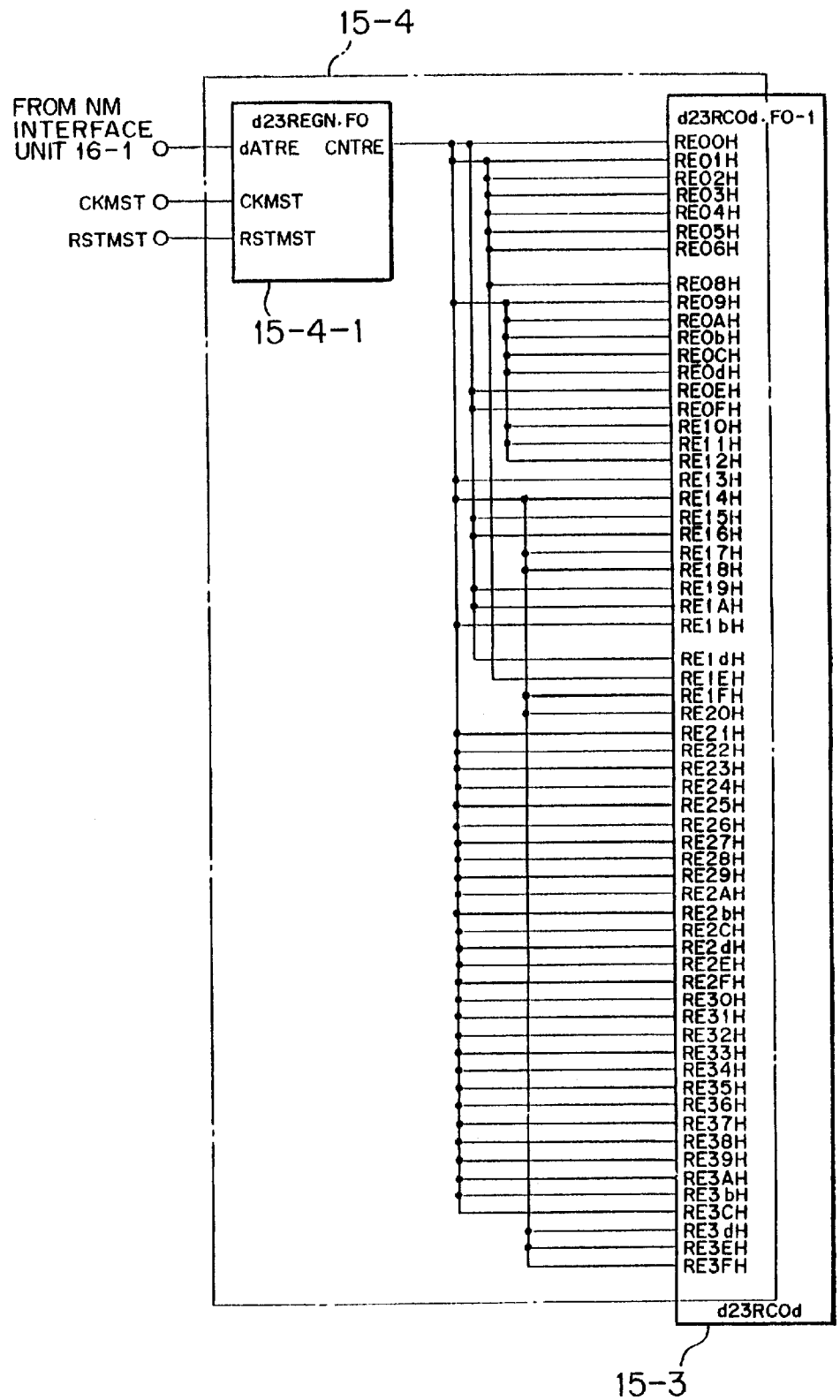
FIG. 13 is a diagram showing a forced reset unit in the embodiment of the present invention.

FIG. 13 is a diagram showing the forced reset unit 15-4. The forced reset unit 15-4 shown in FIG. 13 cancels a state in which the code is held according to a control signal from the NM interface unit 16-1.

Further, a reset timing centralizing unit 15-4-1 has the function of centralizing, for convenience of processing, a plurality of "reset control signals" input from the NM interface unit 16-1 in the DS3 input clock serving as the master clock.

The "reset control signals" centralized in the master clock are input into the received code detection holding circuit 15-3, and are used for a reset control of the corresponding received code detection holding circuit.

Further, the loopback execution/cancellation control signal from the NM interface unit 16-1 is also sent to the loopback signal detecting circuit, and has the function of initializing the corresponding loopback signal detecting circuit by the cancellation signal, that is, of canceling the code held in the received code detection holding circuit 15-3.

Thus, the loopback signal detecting circuit 15 has the function as the protected detecting unit to output the result of detection showing that the loopback is to be executed or canceled when the loopback execution/cancellation information is detected from the C-bit in the DS3 signal plurality of times.

The control unit 16 includes the NM interface unit 16-1 and a network monitoring device (NM) 16-2.

When a code is detected in the loopback signal detecting circuit 15, the NM interface unit 16-1 posts the code to the network monitoring device (NM) 16-2, and posts a control signal from the network monitoring device (NM) 16-2 to the loopback signal detecting circuit 15 and a DS1 loopback circuit, thereby serving as connecting equipment between the network monitoring device (NM) 16-2 and the respective circuits (12, 13, 15, 17, and so forth).

The control unit 16-2 makes a control for loopback execution or loopback cancellation depending upon information or the code added to a frame of the C13 in the DS3 signal.

Figure 18:
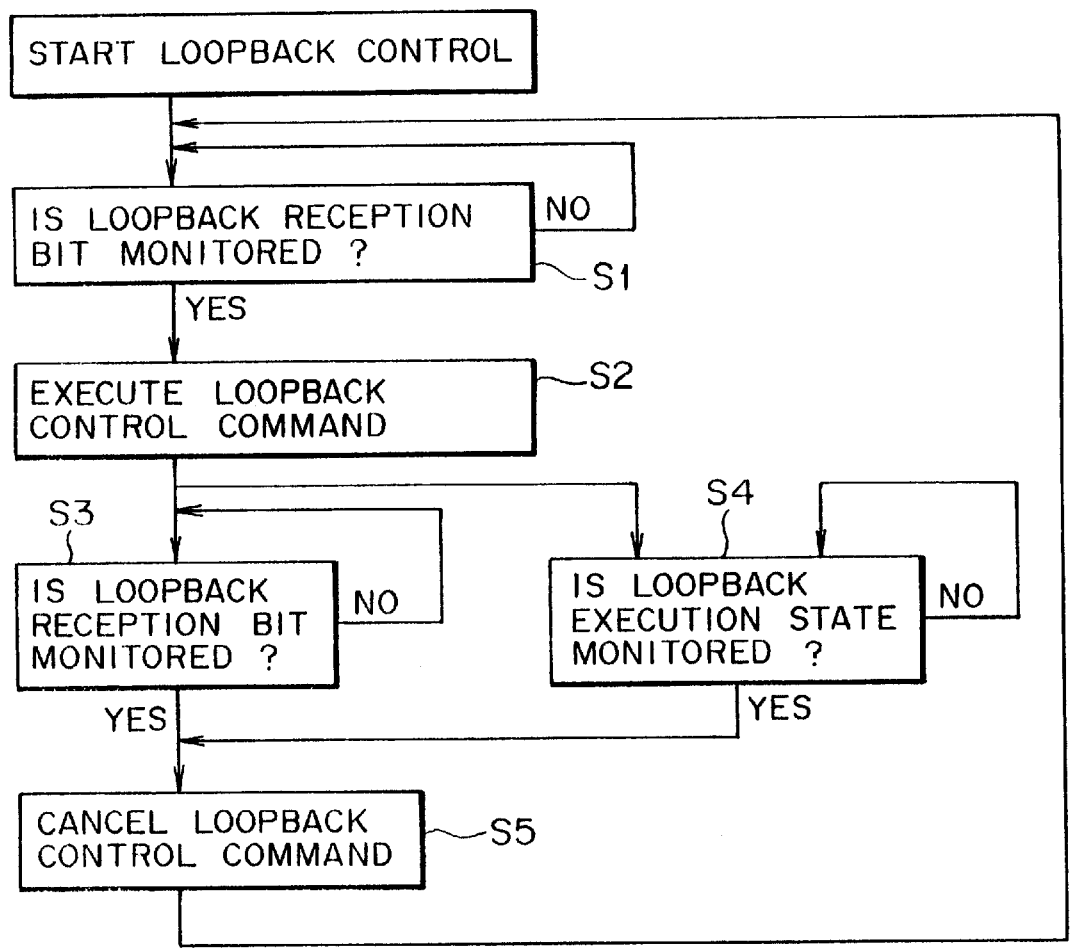
FIG. 18 is a flowchart for explaining control procedure of a control unit in the embodiment of the present invention.

FIG. 18 is a flowchart for explaining illustrative procedure of a loopback control in the network monitoring device (NM) 16-2. A description will now be given of a control step with attention to one code.

When the loopback control is started in the network monitoring device (NM) 16-2, the network monitoring device (NM) 16-2 monitors whether or not a code detected in the loopback signal detecting circuit 15 is the loopback execution code (Step S1). If no loopback execution code is detected, subsequent monitoring is continued. Otherwise, if the loopback execution code is detected, a loopback control command is executed (Step S2).

In other words, for the loopback control of a channel corresponding to the code, the channel is addressed in the network monitoring device (NM) 16-2 to execute the loopback execution command.

When the network monitoring device (NM) 16-2 executes the loopback execution command, the network monitoring device (NM) 16-2 posts a message to this effect through the NM interface unit 16-1 to the loopback signal detecting circuit 15, the DS1 loopback memory circuit 12, and so forth.

After the execution of the loopback, the network monitoring device (NM) 16-2 monitors a code for cancellation of the loopback. Put another way, it is monitored whether or not a loopback cancellation code is detected in the loopback signal detecting circuit 15. If no loopback cancellation code is detected, subsequent monitoring of the cancellation code is continued (Step S3). Otherwise, if the loopback cancellation code is detected, the loopback control command is canceled (Step S5)

That is, for the loopback control of the channel corresponding to the code, the channel is addressed in the network monitoring device (NM) to execute the loopback cancellation command. When the network monitoring device (NM) 16-2 executes the loopback cancellation command, the network monitoring device (NM) 16-2 posts a message to this effect through the NM interface unit 16-1 to the loopback signal detecting circuit 15, the DS1 loopback memory circuit 12, and so forth.

When the detected code holding unit 15-3 receives the message showing the loopback cancellation, the detected code holding unit 15-3 cancels (resets) the loopback execution code.

On the other hand, if no code for loopback cancellation is detected after the control of the loopback execution, the network monitoring device (NM) 16-2 monitors the loopback cancellation code, and a loopback execution state (Step S4).

That is, after the execution of the loopback, it is monitored whether or not desired requirements for cancellation (such as time monitoring after execution) are met. When it is found that the desired requirements for cancellation are met depending upon the monitoring of the loopback execution state, the network monitoring device (NM) 16-2 forcedly resets (cancels) the loopback execution code held in the detected code detection holding unit 15-3. For this purpose, the network monitoring device (NM) 16-2 outputs a message to this effect to the forced reset unit 15-4 through the NM interface unit 16-1. Otherwise, if all the desired requirements for cancellation are not met, the network monitoring device (NM) 16-2 keeps monitoring the loopback execution state (Step S4).

If the loopback cancellation command is executed according to the monitoring of the loopback execution state (from Step S4 to Step S5), the monitoring of the loopback cancellation code is terminated.

As stated above, the control unit 16 includes the NM interface unit 16-1 and the network monitoring device (NM) 16-2, and has the function of making the control to cancel the loopback execution when the predetermined requirements are met after the loopback execution. Further, the control unit 16 has the function as the loopback control unit which can output a forced reset signal for forced reset of the state detected in the protected detecting unit when the loopback is canceled.

As described above, FIG. 18 is the flowchart showing the loopback control procedure in the control unit 16 with respect to one code.

In other words, as shown in FIG. 18, the control unit monitors, for each channel, the loopback execution/cancellation code (an all-channel loopback control code for an all-channel loopback control, or a specified channel loopback control code for a specified channel loopback control).

The clock generating unit 17 generates a read clock for the DS3 signal loopback memory circuit 13 and an operation clock of the M13 MUX 11-2 serving as the multiplexing unit.

Figure 14:
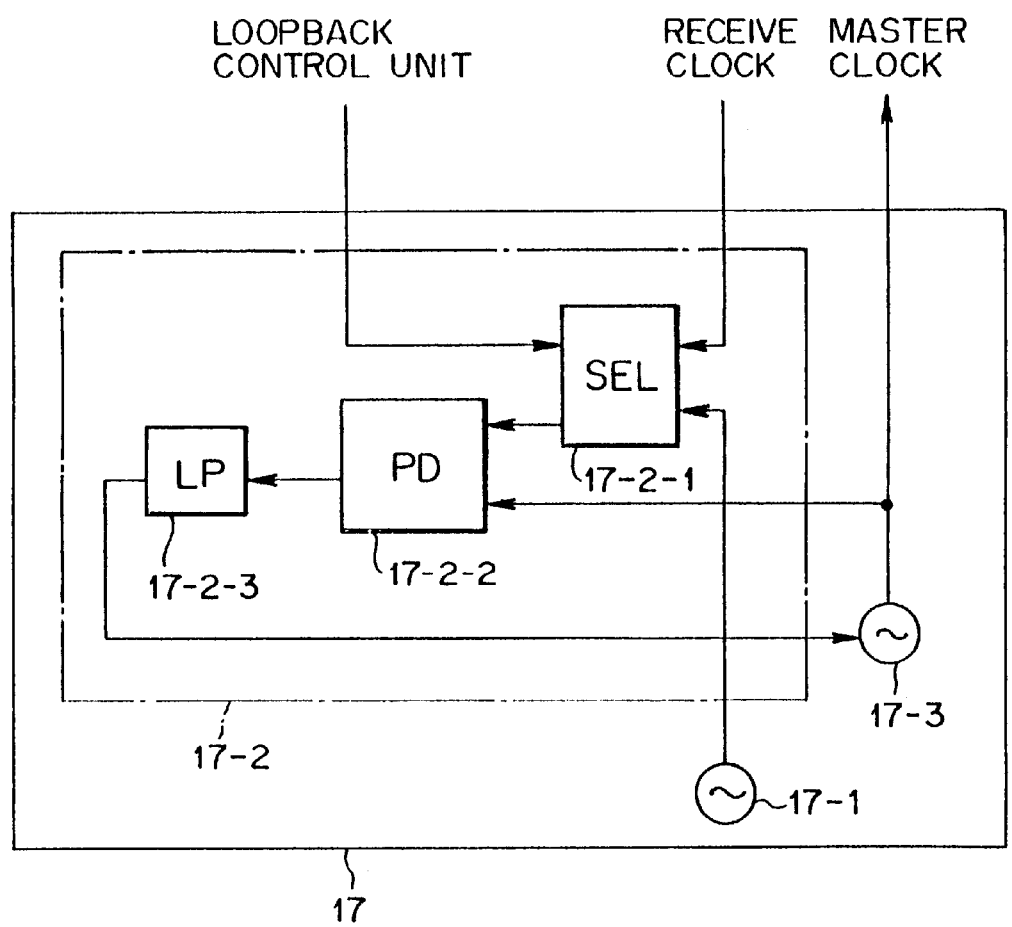
FIG. 14 is a diagram showing a clock generating unit in the embodiment of the present invention.

FIG. 14 is a diagram showing one illustration of the clock generating unit 17. The clock generating unit 17 shown in FIG. 14 includes an XO (normal reference clock generating unit) 17-1, a clock selecting circuit 17-2, and a transmit clock oscillating unit (VCXO) 17-3 serving as a voltage-controlled oscillator.

The clock selecting circuit 17-2 includes a selector circuit 17-2-1, a phase comparator circuit 17-2-2, and a low-pass filter (LP) 17-2-3. The XO (normal reference clock generating unit) 17-1 and the clock selecting circuit 17-2 form a PLL (Phase-Locked Loop) circuit.

The selector circuit 17-2-1 selects any one of a receive clock and a transmit (master) clock depending upon the signal from the NM interface unit 16-1. That is, the selector circuit 17-2-1 selects the receive clock when writing data on the memory 13-1, and selects the transmit clock when reading data from the memory 13-1.

That is, the selector circuit 17-2-1 uses the VCXO to oscillate the transmit clock so as to enable switching of reference timing for a phase comparison.

In other words, the clock selecting circuit 17-2 selects the receive clock as the reference clock, and makes the phase comparison of the external VCXO serving as a transmit clock source in order to feed back the result of comparison in the PLL circuit. It is thereby possible to establish synchronization between the reference clock and a clock of the external VCXO.

For example, the loopback control signal is transmitted as an FEAC (Far End Alarm and Control) code. The 16-bit FEAC code uses a time slot of the C-bit (C13) in the DS3 frame, and is classified into three groups: i) Alarm and Status (priority), ii) In Band Loop Back (loopback signal), and iii) UNASSIGNED CODE.

Figure 20A:

FIG. 20(A) is a diagram showing a simplified mode of data transmission in the DS3 C-bit parity system. As shown in FIG. 20(A), the FEAC code is transmitted by inserting one code (shown by reference mark "A," or "B" in the drawing) successively ten times, and inserting an Idle code "1" when no FEAC code is inserted.

Figure 20B:
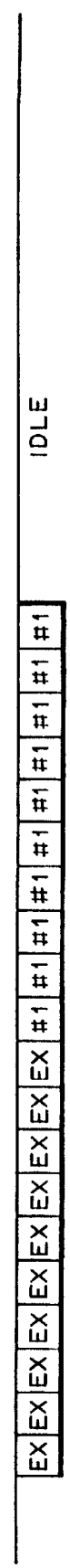

FIG. 20(B) is a diagram similarly showing another simplified mode of data transmission in the DS3 C-bit parity system. As shown in FIG. 20(B), in the loopback signal (ii), the loopback execution code "11111111 01110000" or the loopback cancellation code "11111111 00011100" is sent ten times, and thereafter a code for specifying a target control execution channel (CH) #1 is sent ten times. That is, a decision of the loopback signal is made by using the codes obtained by the twenty transmissions.

In FIG. 20(B), after the loopback execution (abbreviated as "EX" in the drawing) is sent ten times, the code (shown by reference numeral "#1" in the drawing) for specifying the target control channel (CH) is sent ten times.

Figure 20C:

FIG. 20(C) is a diagram similarly-showing a further simplified mode of data transmission in the DS3 C-bit parity system. As shown in FIG. 20(C), the insertions of the FEAC codes (i) and (iii) are preceded by the insertion of the FEAC code (ii), i.e., the loopback signal code.

As is apparent from the foregoing, in the loopback signal among the FEAC codes, the loopback execution or loopback cancellation may be sent ten times, and thereafter the code for specifying the target control channel may be sent ten times.

According to the above configuration, when the code (information) is added to the C13 in the DS3 signal, and the same code is continuously detected a predetermined number of times (for example, seven times in ten decisions) in the protection circuit 15-1, the code is sent to the received code decision unit 15-2 so as to determine the type of code.

For the determination, the received code decision unit 15-2 decodes the code sent from the protection circuit 15-1.

After the determination of code, the code is held in the received code detection holding unit 15-3, and is posted to the NM interface unit 16-1.

When the network monitoring device (NM) 16-2 receives the code or information showing that the loopback to be executed, the network monitoring device (NM) 16-2 sends the loopback execution signal through the NM interface unit 16-1 to the loopback signal detecting circuit 15, the DS3 loopback memory circuit 13 or the DS1 loopback memory circuit 12, the selector 14, and the clock generating unit 17.

In the DS3 loopback memory circuit 13 receiving the DS3 loopback execution signal from the NM interface unit 16-1, the phase comparing unit makes the phase comparison between the write pulse and the read pulse. Under the monitoring, the DS3 signal data is stored in the 4-bit memory by the write pulse from the pulse generator. The data stored in the 4-bit memory is read depending upon the read pulse, thereby executing the loopback.

In the clock generating unit 17 receiving the DS3 loopback execution signal, the selector circuit 17-2-1 selects the receive clock as the reference clock when data from the DS3 signal is written on the memory 3-1, while the selector circuit 17-2-1 selects the transmit clock as the reference clock when data is read from the memory.

When the selector 14 receives the DS3 loopback execution signal, the selector circuit selects the DS3 loopback signal.

Besides, by a signal showing that the DS3 signal loopback is to be canceled, the NM interface unit 16-1 instructs the DS3 loopback memory circuit 13 to cancel the DS3 signal loopback. According to the instruction, the DS3 loopback memory circuit 13 stops returning of the DS3 input signal, and places an output DS3 signal on an output line of the M13 MUX 11-2, thereby canceling the DS3 signal loopback.

Further, when the loopback signal detecting circuit receives the DS3 loopback cancellation signal, the loopback signal detecting circuit 15 cancels (resets) a code corresponding to the loopback execution held in the loopback signal detecting circuit corresponding to the loopback to be canceled.

On the other hand, when execution/cancellation of DS1 signal loopback is controlled, for example, an execution signal for DS1 CH#1 (channel #1) may be detected in the loopback signal detecting circuit 15. In this case, the network monitoring device (NM) 16-2 instructs, through the NM interface unit 16-1, the DS1 loopback memory circuit 12 to execute DS1 CH#1 loopback. According to the instruction, the DS1 loopback memory circuit 12 returns and inputs a DS1 output signal #1 into the M13 MUX 11-2, thereby realizing the loopback of the DS1 signal.

Further, the loopback signal detecting circuit 15 continuously monitors the loopback execution/cancellation signal depending upon the C-bit. Hence, when a signal for cancellation of the DS1 CH#1 loopback is detected, the NM interface unit 16-1 instructs the DS1 loopback memory circuit 12 to cancel the DS1 CH#1 loopback. The DS1 loopback memory circuit 12 stops returning of the DS1 output signal #1 according to the instruction from the network monitoring device (NM) 16-2, and inputs an input DS1 signal CH#1 into the M13 MUX 11-2, thereby canceling the DS1 signal loopback.

Meanwhile, when no code showing that the loopback is to be canceled is detected in the loopback signal detecting circuit 15 after detection of the code showing that the loopback is to be executed, a software control forcedly cancels a code corresponding to the loopback execution.

That is, the network monitoring device (NM) 16-2 outputs a signal for loopback cancellation to the forced reset unit 15-4 through the NM interface unit 16-1, thereby canceling the loopback.

In addition, for the FEAC codes (the Alarm and Status (i), and the UNASSIGNED CODE (iii)) other than the loopback signal, the NM interface unit 16-1 outputs the signal for cancellation to the forced reset unit 15-4 so as to cancel a state in which the codes are held in the received code detection holding unit 15-3, resulting in reset.

FIGS. 19(A) to (E) are time charts showing simplified control operations of the control unit 16 with respect to the FEAC codes: i) Alarm and Status (abbreviated as A CODE in FIG. 19), and iii) UNASSIGNED CODE (abbreviated as B CODE in FIG. 19) in a relationship between the received code detection holding unit 15-3 and the forced reset unit 15-4.

FIGS. 19(A) and (B) are time charts showing states in which the FEAC codes are received in the loopback signal detecting protection circuit 15. When the FEAC codes: i) Alarm and Status, and iii) UNASSIGNED CODE are detected in the received code decision unit 15-2, the received code detection holding unit 15-3 holds the detected code until read access (shown by the dotted lines in FIG. 19(C)) is given by the control unit 16 (FIGS. 19(A) and (B)). If reception of the code is kept when the control unit 16 has read access to the code, the received code detection holding unit 15-3 holds the code until the next read access (FIG. 19(D)). Otherwise, if the code is not received during the read access, the control unit 16 cancels the state in which the code is held (FIG. 19(E)). That is, the control unit 16 outputs a reset signal to the forced reset unit 15-4.

As stated above, the signal loopback device 20 according to the present invention includes the M13 MUX 11-1 and the D13 MUX 11-2 to carry out the multiplexing/demultiplexing between the DS3 signal serving as the digital signal conforming to the DS3 C-bit parity system and the DS1 signal, the DS1 loopback memory circuit 12 mounted on the side of DS1 signal input-output of the M13 MUX 11-1 and the D13 MUX 11-2, to temporarily contain the DS1 signal and read the stored DS1 signal, thereby returning the DS1 signal, the DS3 loopback memory circuit 13 mounted on the side of DS3 signal input-output of the M13 MUX 11-1 and the D13 MUX 11-2, to temporarily contain the DS3 signal, and read the stored DS3 signal, thereby returning the DS3 signal in an original input signal format, the selector 7 to select any one of the DS3 signal output from the M13 MUX 11-1 and the D13 MUX 11-2, and the DS3 loopback signal from the DS3 loopback memory circuit 13, the loopback signal detecting circuit 15 to output, when detecting the loopback execution/cancellation information from the C-bit in the DS3 signal plurality of times, the result of detection showing that the loopback is to be executed or canceled, and the control unit 16 to make a control for loopback execution or loopback cancellation to the DS1 loopback memory circuit 12, the DS3 loopback memory circuit 13, and the selector 14 depending upon the result of detection in the loopback signal detecting circuit 15. As a result, even in a state in which an error occurs in a line (degradation in, for example, line quality occurs), it is possible to ensure loopback execution/cancellation, thereby preventing an erroneous control of the loopback. In addition, it is sufficient to provide only one (common) logic circuit (hardware) causing the distortion of the output waveform. Thus, it is also possible to cancel the distortion of the output waveform, and keep the output waveform constant irrespective of whether the loopback is in execution or left unexecuted.

The loopback signal detecting circuit 15 includes the detected code holding unit to hold the result of detection showing that the loopback is to be executed or canceled, and the loopback control unit includes the forced reset unit 15-4 to forcedly reset the state detected in the protected detecting unit when the loopback is canceled. Further, the loopback signal detecting circuit 15 includes the forced reset unit to forcedly reset, when receiving the forced reset signal from the loopback control unit, the result of detection held in the detected code holding unit. As a result, it is possible to ensure the loopback execution/cancellation even in the state in which an error occurs in the line (the degradation in line quality occurs). Further, it is possible to initialize the detecting circuit according to the software control even in an abnormal state in which, for example, a failure occurs in the remote station (control station) with the loopback control uncanceled, thereby preventing an erroneous control of the loopback.

In addition, the memory 3-1 can directly contain the P/N-bipolar data. It is also possible to directly return as the original logic bipolar signal the input DS3 signal to be looped back without a decoder circuit.

With the operation of the phase comparing unit, read timing can continuously be positioned in the vicinity of an intermediate portion of the write timing. It is thereby possible to prevent a loss of the read data even when a variation in clock is caused due to a variation in power source or a variation in temperature.

It must be noted that the: present invention should not be limited to the signal loopback device for the loop back of the DS3 signal and the DS1 signal, and may similarly be applied to another signal loopback device for loopback of another communication signal (digital signal).

In addition, in the embodiment of the signal loopback device of the present invention, if the FEAC code other than the loopback code is added to the C13 in the DS3 signal, it is not always necessary to provide the loopback memory circuit, the D13 MUX, the M13 MUX, and so forth. Without these components, it is possible to surely prevent the erroneous signal detection.

What is claimed is:

1. A signal loopback device comprising:
   a multiplexing/demultiplexing unit to carry out multiplexing/demultiplexing between a DS3 signal serving as a digital signal conforming to a DS3 C-bit parity system and a DS1 signal serving as a digital signal having a lower speed than that of the DS3 signal;
   a DS1 signal loopback storage unit mounted on the side of DS1 signal input-output of the multiplexing/demultiplexing unit to temporarily contain the DS1 signal, and read the stored DS1 signal, thereby returning the DS1 signal;
   a DS3 signal loopback storage unit mounted on the side of DS3 signal input-output of the multiplexing/demultiplexing unit to temporarily contain the DS3 signal, and read the stored DS3 signal, thereby returning the DS3 signal in an original input signal format;
   a selecting unit to select any one of DS3 signal output from the multiplexing/demultiplexing unit and a DS3 loopback signal from the DS3 signal loopback storage unit;

a protected detecting unit to output, when detecting loopback execution/cancellation information from a C-bit in the DS3 signal plurality of times, a result of detection showing that loopback is to be executed or canceled; and a loopback control unit to make a control for loopback execution or loopback cancellation to the DS1 signal loopback storage unit, the DS3 signal loopback storage unit, and the selecting unit depending upon the result of detection in the protected detecting unit.

2. A signal loopback device according to claim 1, further comprising:

a clock generating unit to generate a read clock for the DS3 signal loopback storage unit, and an operation clock for a multiplexing unit in the multiplexing/demultiplexing unit, wherein the clock generating unit is configured as a PLL circuit having a reference clock oscillating unit, a clock selectable phase comparing unit to select any one of a receive clock and a reference clock from the reference clock oscillating unit so as to output phase comparison output with respect to the selected clock, and a clock oscillating unit to output the read clock or the operation clock in response to the phase comparison output from the clock selectable phase comparing unit.

3. A signal loopback device according to claim 1, wherein the DS3 signal has a bipolar signal format, the DS3 signal in the bipolar format being written on the DS3 signal loopback storage unit, and the DS3 signal in the original bipolar format being read therefrom.

4. A signal loopback device according to claim 1, wherein the DS3 signal loopback storage unit is written according to a write clock in synchronization with a receive clock, and the DS3 signal loopback storage unit being read according to a read clock in synchronization with the receive clock, and a clock phase adjusting unit monitoring a phase relationship between the write clock and the read clock, and forcedly shifting by a predetermined amount any one of the write clock and the read clock when a difference in phase between the write clock and the read clock is equal to a predetermined value or less.

5. A signal loopback device according to claim 1, wherein the protected detecting unit comprises a detection result holding unit to hold a result of detection showing that the loopback is to be executed or canceled, the loopback control unit being capable of outputting a forced reset signal for forced reset of a state detected in the protected detecting unit when the loopback is canceled, and the protected detecting unit having a forced reset unit to forcedly reset, when receiving the forced reset signal from the loopback control unit, the result of detection held in the detection result holding unit.

6. A signal loopback device comprising:

a loopback unit for temporarily containing a digital input signal input through an input line, and returning the digital input signal in an original input signal format to an output line for loopback;

a protected detecting unit to output, when detecting loopback execution/cancellation information from the digital input signal plurality of times, a result of detection showing that the loopback is to be executed or canceled; and a loopback control unit to make a control for loopback execution or loopback cancellation to the loopback unit depending upon the result of detection in the protected detecting unit;

wherein the loopback unit comprises a storage unit to temporarily contain the digital input signal, the storage unit being written according to a write clock in synchronization with a receive clock, and the storage unit being read according to a read clock in synchronization with the receive clock.

7. A signal loopback device according to claim 6, further comprising a clock phase adjusting unit to monitor a phase relationship between the write clock and the read clock, and forcedly shift by a predetermined amount any one of the write clock and the read clock when a difference in phase between the write clock and the read clock is equal to a predetermined value or less.

8. A signal loopback device according to claim 7, wherein the digital input signal has a bipolar signal format, the digital input signal in the bipolar format being written on the storage unit, and the digital input signal in the original bipolar format being read therefrom.

9. A signal loopback device comprising:

a loopback unit for temporarily containing a digital input signal input through an input line, and returning the digital input signal in an original input signal format to an output line for loopback;

a protected detecting unit to output, when detecting loopback execution/cancellation information from the digital input signal plurality of times, a result of detection showing that the loopback is to be executed or canceled; and a loopback control unit to make a control for loopback execution or loopback cancellation to the loopback unit depending upon the result of detection in the protected detecting unit;

wherein the protected detecting unit comprises a detection result holding unit to hold a result of detection showing that loopback is to be executed or canceled, the loopback control unit outputting a forced reset signal for forced reset of a state detected in the protected detecting unit when the loopback is canceled, and the protected detecting unit having a forced reset unit to forcedly reset, when receiving the forced reset signal from the loopback control unit, the result of detection held in the detection result holding unit.

* * * * *